(12) United States Patent
Shiozaki et al.

(10) Patent No.: US 6,882,777 B2
(45) Date of Patent: Apr. 19, 2005

(54) OPTICAL WAVEGUIDE DIFFRACTION GRATING DEVICE, METHOD FOR FABRICATING OPTICAL WAVEGUIDE DIFFRACTION GRATING DEVICE, MULTIPLEXING/DEMULTIPLEXING MODULE, AND OPTICAL TRANSMISSION SYSTEM

(75) Inventors: Manabu Shiozaki, Yokohama (JP); Akira Inoue, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 188 days.

(21) Appl. No.: 10/240,200

(22) PCT Filed: Sep. 7, 2001

(86) PCT No.: PCT/JP01/07805
§ 371 (c)(1),
(2), (4) Date: Sep. 30, 2002

(87) PCT Pub. No.: WO02/25332
PCT Pub. Date: Mar. 28, 2002

(65) Prior Publication Data
US 2003/0156790 A1 Aug. 21, 2003

(30) Foreign Application Priority Data
Sep. 20, 2000 (JP) ..................... P2000-285560

(51) Int. Cl.[7] .............................................. G02B 6/34
(52) U.S. Cl. ........................... 385/37; 385/10; 359/558
(58) Field of Search ............................. 385/37, 10, 31, 385/39, 15, 27; 359/558

(56) References Cited

U.S. PATENT DOCUMENTS

| | | | | |
|---|---|---|---|---|
| 5,433,197 A | * | 7/1995 | Stark ........................... 600/319 |
| 5,537,432 A | * | 7/1996 | Mehuys et al. ............... 372/50 |
| 5,799,118 A | * | 8/1998 | Ogusu et al. ................. 385/14 |
| 6,067,391 A | * | 5/2000 | Land ............................ 385/27 |
| 6,072,927 A | | 6/2000 | Iwashima et al. | |
| 6,453,095 B1 | * | 9/2002 | Feng et al. ................... 385/37 |
| 6,559,994 B1 | * | 5/2003 | Chen et al. ................. 398/182 |

FOREIGN PATENT DOCUMENTS

| | | |
|---|---|---|
| EP | 896233 A1 | 2/1999 |
| EP | 1014124 A2 | 6/2000 |
| JP | 11-52148 | 2/1999 |
| JP | 2001-74925 A | 3/2001 |
| JP | 2001-83337 A | 3/2001 |
| JP | 2001-188137 | 7/2001 |

OTHER PUBLICATIONS

Ibsen, M. et al., Optimised square passed fibre Bragg grating filter with in–band flat group delay response, In: Electronics Letters vol. 34, No. 8, Apr. 16, 1998, pp. 800–802.

(Continued)

Primary Examiner—Frank G. Font
Assistant Examiner—Kevin Kianni
(74) Attorney, Agent, or Firm—McDermott Will & Emery LLP

(57) ABSTRACT

The present invention relates to a diffraction grating device in which a diffraction grating based on perturbation of refractive index is formed through a predetermined range in a light guide direction in an optical waveguide and in which the diffraction grating selectively reflects light in a reflection band out of light guided through the optical waveguide. In the diffraction grating device, where a first band is defined as a band with a maximum bandwidth out of continuous wavelength bands for which the transmittance is not more than $T_0$ and where a second band is defined as a wavelength band between a maximum wavelength and a minimum wavelength out of wavelengths for which the reflectance is $R_0$, $T_0$ is not more than $-20$ dB and $R_0$ is not more than $-20$ dB. A ratio ($B_1/B_2$) of a width $B_1$, of the first band to a width $B_2$ of the second band is not less than 0.3. A maximum group delay difference caused by reflection of the light in the first band by the diffraction grating is not more than a predetermined limit, $0.011 \times \exp(7.86 \times B_1/B_2 - 0.045 \times R_0)/B_1$.

10 Claims, 34 Drawing Sheets

OTHER PUBLICATIONS

Ibsen, M. et al., 99.9% Reflectivity Dispersion–less Square-filter Fibre Bragg Gratings for High Speed DWDM Networks, In: Optical Fiber Communication Conference, 2000, vol. 4, pp. 230–232.

Skaar, J. et al., "A Genetic Algorithm for the Inverse Problem in Synthesis of Fiber Gratings", Journal of Lightwave Technology, vol. 16, No. 10, Oct. 1998, pp. 1928–1932.

Skaar, J. et al., "High–reflectivity fiber–optic bandpass filter designed by use of the iterative solution to the Gel'fand–Levitan–Marchenko equations", Optic Letters, vol. 23, No. 12, Jun. 15, 1998, pp. 933–935.

Feced, R. et al., "An Efficient Inverse Scattering Algorithm for the Design of Nonuniform Fiber Bragg Gratings", IEEE Journal of Quantum Electronics, vol. 35, No. 8, Aug. 1999, pp. 1105–1115.

Ibsen, M. et al., "High Reflectivity Linear–Phase Fibre Bragg Gratings for Dispersion–Free Filtering In DWDM Systems", Fifth Optoelectronics and Communications Conference (OECC 2000), Technical Digest, Jul. 2000, pp. 16–17.

* cited by examiner

OPTICAL WAVEGUIDE DIFFRACTION GRATING DEVICE, METHOD FOR FABRICATING OPTICAL WAVEGUIDE DIFFRACTION GRATING DEVICE, MULTIPLEXING/DEMULTIPLEXING MODULE, AND OPTICAL TRANSMISSION SYSTEM

TECHNICAL FIELD

The present invention relates to a diffraction grating device in which a diffraction grating based on perturbation of refractive index is formed through a predetermined range in a light guide direction in an optical waveguide, a method of making the same, a multiplexer/demultiplexer module incorporating the diffraction grating device and configured to multiplex or demultiplex light, and an optical transmission system incorporating the multiplexer/demultiplexer module and configured to perform optical transmission with multi-wavelength signal light.

BACKGROUND ART

A diffraction grating device is a device in which a diffraction grating based on perturbation of refractive index is formed through a predetermined range in a light guide direction in an optical waveguide (e.g., an optical fiber). This diffraction grating device is able to selectively reflect light within a predetermined reflection band out of light guided through the optical waveguide, by the diffraction grating. A multiplexer/demultiplexer module incorporating this diffraction grating device is able to multiplex or demultiplex light by selectively reflecting light in the reflection band by the diffraction grating device and is used, for example, in WDM (Wavelength Division Multiplexing) transmission systems configured to perform optical transmission using wavelength-multiplexed signal light of multiple wavelengths.

In general, the diffraction grating device is provided with the diffraction grating based on refractive index perturbation of a definite period $\Lambda$ through the predetermined range in the light guide direction in the optical waveguide and this diffraction grating selectively reflects light of wavelength $\lambda$ satisfying the Bragg condition represented by the equation of $\lambda = 2N \cdot \Lambda$, but transmits light of the other wavelengths Here N is an average effective refractive index in the index perturbation region of the optical waveguide.

There arises a problem of group delay difference in the reflection of light in the reflection band by the diffraction grating device of this type. Specifically, reflection of light in the diffraction grating occurs everywhere in the light guide direction in the diffraction grating, so that effective reflection positions vary according to wavelengths, which causes group delays in the reflected light. If the wavelength dependence of the group delays is strong in the reflection band, the waveform of the signal light will deteriorate due to the reflection in the diffraction grating device, so as to cause a reception error easily, which does not permit increase of capacity in the WDM transmission.

Consequently, the diffraction grating devices designed to decrease the group delay difference caused by the reflection of light in the reflection band are described in Document 1 "M. Ibsen, et al., "Optimised square passband fibre Bragg grating filter with in-band flat group delay response," Electron. Lett., Vol. 34, No. 8, pp.800–802 (1998)" and Document 2 "M. Ibsen, et al., "99.9% Reflectivity Dispersion-less Square-filter Fibre Bragg Gratings for High Speed DWDM Networks," OFC' 2000, PD21 (2000)."

The diffraction grating device described in Document 1 includes the apodized diffraction grating having a nonuniform amplitude distribution of refractive index perturbation. By setting the origin at the center position of the predetermined range in which the perturbation of refractive index of the diffraction grating is formed, defining the z-axis along the light guide direction with respect to the origin, and expressing the amplitude distribution of the index perturbation of the diffraction grating by a function of a parameter z, the apodized amplitude distribution is expressed by the product of a sinc function and a Gaussian function and is of antero-posterior symmetry with respect to the center on the center position of the predetermined range.

The diffraction grating device described in Document 2 also includes the apodized diffraction grating having the nonuniform amplitude distribution of index perturbation. The amplitude distribution of refractive index perturbation in the diffraction grating device is one designed by the layer peeling technique layer peeling Bragg grating design method). Specifically, the predetermined range in which the refractive index perturbation of the diffraction grating is to be formed, is divided into a number of small zones and refractive indices of the respective small zones are determined in order from one end of the predetermined range so as to achieve desired reflectivity characteristics on the whole of the diffraction grating, thereby designing the amplitude distribution of perturbation of refractive index.

DISCLOSURE OF THE INVENTION

The Inventor et al. studied the above-stated prior art and found the following problems. Namely, the diffraction grating devices described in aforementioned Document 1 and Document 2 demonstrate the smaller group delay difference in the reflection of light in the reflection band, as compared with those including the diffraction grating whose amplitude distribution of refractive index perturbation is uniform or is represented by the Gaussian function. However, the diffraction grating device described in Document 1 has large transmittance for the light in the reflection band and thus transmits part of the light of wavelengths to be reflected. When the multiplexer/demultiplexer module incorporating such a diffraction grating device is used in the WDM transmission system, crosstalk occurs between the light actually transmitted by the diffraction grating device out of the light of wavelengths to be transmitted and the part transmitted by the diffraction grating device out of the light of wavelengths to be reflected, in the case of the difference between wavelengths being small, so as to increase the reception error rate. Since the diffraction grating device transmits part of the light of wavelengths to be reflected, a power loss also occurs in the light actually reflected by the diffraction grating device out of the light of wavelengths to be reflected. When the diffraction grating device described in Document 1 is compared with those including the diffraction grating whose amplitude distribution of index perturbation is uniform or is expressed by the Gaussian function, the group delay difference is smaller in the reflection of light in the reflection band, but the group delay difference is not small enough yet.

The diffraction grating device described in Document 2 has the much smaller group delay difference in the reflection of light, as compared with that described in Document 1. However, the length of the predetermined range in which the index perturbation of the diffraction grating is formed, is as long as 120 mm, and it is thus difficult to realize a temperature regulating mechanism or a temperature compensating mechanism for restraining variation of reflection characteristics generally caused by variation of temperature. In addition, the amplitude distribution of index perturbation of the diffraction grating is not of antero-posterior symmetry with respect to the center on the center position of the predetermined range, i.e., it is asymmetric; it is thus necessary to use two diffraction grating devices, in order to realize a multiplexer/demultiplexer module (optical ADM: Add-Drop Multiplexer) capable of both multiplexing and demultiplexing. This also results in increase in the scale of the multiplexer/demultiplexer module.

The present invention has been accomplished in order to solve the above problems and an object of the invention is to provide a diffraction grating device in which the group delay difference appears small in the reflection of light in the reflection band, in which the length of the predetermined range including the refractive index perturbation of the diffraction grating is short, and in which the amplitude distribution of the refractive index perturbation of the diffraction grating is of antero-posterior symmetry with respect to the center on the center position of the predetermined range, and a method of producing the diffraction grating device. Another object of the present invention is to provide a multiplexer/demultiplexer module incorporating the diffraction grating device and an optical transmission system incorporating the multiplexer/demultiplexer module.

A diffraction grating device according to the present invention is a diffraction grating device in which a diffraction grating based on perturbation of refractive index is formed through a predetermined range in a light guide direction in an optical waveguide and in which the diffraction grating selectively reflects light in a reflection band out of light guided through the optical waveguide, wherein, where a first band is defined as a wavelength band with a maximum bandwidth out of continuous wavelength bands for which the transmittance is not more than $T_0$ (unit: dB) and where a second band is defined as a wavelength band between a maximum wavelength and a minimum wavelength out of wavelengths for which the reflectance is $R_0$ (unit: dB), the perturbation of refractive index of the diffraction grating is of antero-posterior symmetry with respect to the center on a center position of the predetermined range, $T_0$ is not more than $-20$ dB, $R_0$ is not more than $-20$ dB, a ratio ($B_1/B_2$) of a width $B_1$ (unit: nm) of the first band to a width $B_2$ (unit: nm) of the second band is not less than 0.3, and a maximum group delay difference (unit: ps) caused by reflection of light in the first band by the diffraction grating is not more than $0.011 \times \exp(7.86 \times B_1/B_2 - 0.045 \times R_0)/B_1$.

This diffraction grating device exhibits the smaller group delay difference in the reflection of light in the first band, as compared with the conventional devices, and thus deterioration is well restrained in the waveform of the reflected signal light. Since diffraction grating device permits the perturbation of refractive index of the diffraction grating to be formed in the short length of the predetermined range, it is easy to realize the temperature regulating mechanism or the temperature compensating mechanism for restraining the variation in reflection characteristics due to temperature variation. Since in the diffraction grating device the amplitude distribution of the perturbation of refractive index of the diffraction grating is of antero-posterior symmetry with respect to the center on the center position of the foregoing predetermined range, the single diffraction grating device suffices for realization of a multiplexer/demultiplexer module capable of both multiplexing and demultiplexing, thus permitting reduction in size of the multiplexer/demultiplexer module.

A diffraction grating device according to the present invention may be configured so that an amplitude distribution of the perturbation of refractive index of the diffraction grating has a phase inversion portion. This configuration is suitable for realization of the diffraction grating device with the various characteristics as described above. The diffraction grating device according to the present invention may be configured so that a length of the predetermined range where the perturbation of refractive index of the diffraction grating is formed, is not more than 40 mm. This configuration makes the realization of the temperature regulating mechanism or temperature compensating mechanism much easier.

In a diffraction grating device according to the present invention, the maximum group delay difference is preferably not more than 10 ps and the maximum group delay difference is more preferably not more than 2.5 ps. The width $B_2$ of the second band is preferably not more than 1.6 nm and the width $B_2$ of the second band is more preferably not more than 0.8 nm. This configuration is suitably applicable to an optical transmission system for performing the WDM transmission at the bit rate of 10 Gbps (or 40 Gbps) and with the wavelength spacing of 100 GHz (or 50 GHz).

A method of making a diffraction grating device according to the present invention is a method of making the aforementioned diffraction grating device according to the present invention, wherein an amplitude distribution of the perturbation of refractive index of the diffraction grating is designed by nonlinear programming and the diffraction grating device is produced based thereon. This method of making a diffraction grating device permits us to produce the above-stated diffraction grating device.

A multiplexer/demultiplexer module according to the present invention comprises the aforementioned diffraction grating device according to the present invention and is configured to selectively reflect light in the reflection band by means of the diffraction grating device to multiplex or demultiplex light. An optical transmission system according to the present invention is an optical transmission system for performing optical transmission using wavelength-multiplexed signal light of multiple wavelengths, which comprises the aforementioned multiplexer/demultiplexer module according to the present invention and which is configured to multiplex or demultiplex the signal light of multiple wavelengths by means of the multiplexer/demultiplexer module. In this case, the group delay difference appears small in the reflection of light of wavelengths in the first band by the diffraction grating device in the multiplexer/demultiplexer module, and it is thus feasible to suppress the deterioration in the waveform of the reflected signal light of wavelengths and enable large-capacity WDM transmission.

The present invention can be further fully understood on the basis of the following detailed description and accompanying drawings. It is to be understood that these are presented merely for the purpose of illustration but not for the purpose of restrictions on the present invention.

BEST MODE FOR CARRYING OUT THE INVENTION

Embodiments of the present invention will be described below in detail with reference to the accompanying drawings. In the description of the drawings the same elements will be denoted by the same reference symbols and redundant description will be omitted.

Figure 1:
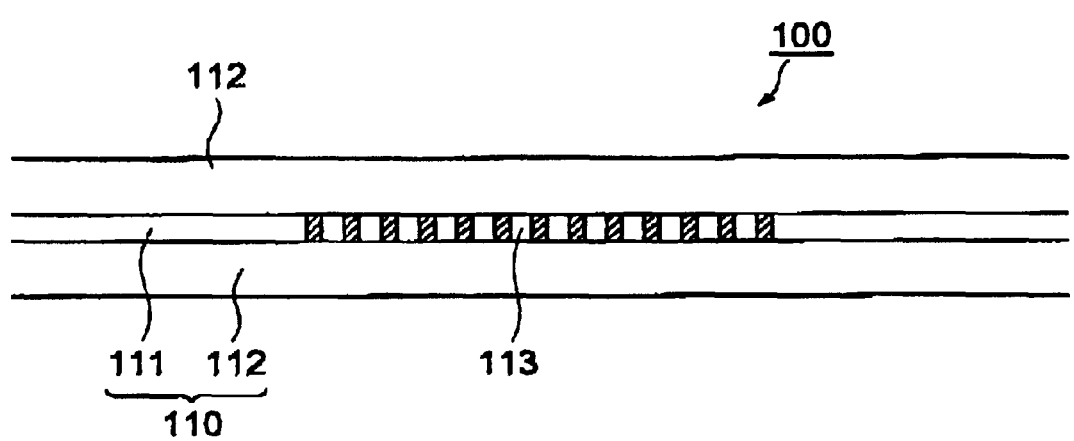
FIG. 1 is a schematic diagram of a diffraction grating device according to the present embodiment.

First, embodiments of the diffraction grating device and the method of making the same according to the present invention will be described. FIG. 1 is a schematic diagram of diffraction grating device 100 according to the present embodiment. This figure shows a sectional view of the diffraction grating device 100 cut by a plane including the optical axis. This diffraction grating device 100 is a device in which a diffraction grating 113 is formed in an optical fiber 110 as an optical waveguide. The optical fiber 110 contains silica glass as a principal component, a core region 111 including the center of the optical axis contains an additional component of $GeO_2$, and a cladding region 112 is provided around the core region 111. The diffraction grating 113 based on perturbation of refractive index $\Delta n_{a11}$ is formed through a predetermined range in the light guide direction in the optical fiber 110.

When the z-axis is taken along the light guide direction with the origin at the center position of the predetermined range where the diffraction grating 113 is formed, the perturbation of refractive index $\Delta n_{a11}(z)$ of this diffraction grating 113 is expressed, for example, by the equation below.

$$\Delta n_{a11}(z) = \Delta n(z)\cos(2\pi z/\Lambda) \quad (1a)$$

$$\Delta n(z) = \sum_{k=1}^{K} a_k \cos\{(2k-1) \cdot \Pi z/2d\} \quad (1b)$$

Here K is an integer not less than 2. The perturbation of refractive index $\Delta n_{a11}$ of the diffraction grating 113 is expressed by the product of a cos function with a definite period $\Lambda$ according to the wavelength $\lambda$ to be reflected, and an amplitude distribution $\Delta n(z)$ of the perturbation of refractive index (Eq (1a)). The amplitude distribution $\Delta n(z)$ of the perturbation of refractive index is expressed by the sum of K cos functions and is an apodized distribution (Eq (1b)). Each of these K cos functions is an even function symmetric with respect to the center on the origin (z=0) in the predetermined range ($-d \leq z \leq +d$) where the perturbation of refractive index is formed, and takes the value of zero at the two ends of the predetermined range (z=±d) and outside the predetermined range (z<–d or +d<z). Periods of the respective functions are different from each other. In this diffraction grating device 100, therefore, the amplitude distribution $\Delta n(z)$ of the perturbation of refractive index of the diffraction grating 113 is of antero-posterior symmetry with respect to the center on the center position (z=0).

Then the first band is defined as a band with a maximum bandwidth out of continuous wavelength bands for which the transmittance of the diffraction grating device 100 according to the present embodiment is not more than $T_0$ (in units of dB). The second band is also defined as a wavelength band between a maximum wavelength and a minimum wavelength out of wavelengths for which the reflectance of the diffraction grating device 100 is $R_0$ (in units of dB). Under this definition, $T_0$ is not more than –20 dB, $R_0$ is not more than –20 dB, the ratio ($B_1/B_2$) of the width $B_1$ of the first band (in units of nm) to the width $B_2$ of the second band (in units of nm) is not less than 0.3, and the maximum group delay difference (in units of ps) caused when the light in the first band is reflected by the diffraction grating 113, is not more than $0.011 \times \exp(7.86 \times B_1/B_2 - 0.045 \times R_0)/B_1$.

In the diffraction grating device 100 as described, the group delay difference is small in the reflection of light in the first band (reflection band), so that the deterioration is suppressed in the waveform of the reflected signal light. Accordingly, it is feasible to increase the capacity in the WDM transmission using the multiplexer/demultiplexer module incorporating the diffraction grating device 100. Since in this diffraction grating device 100 the length 2d of the predetermined range where the perturbation of refractive index of the diffraction grating 113 is formed can be made short, it is easy to realize the temperature regulating mechanism or temperature compensating mechanism for suppressing the variation in the reflection characteristics due to the temperature variation.

In the diffraction grating device 100 according to the present embodiment, preferably, the amplitude distribution $\Delta n(z)$ of the perturbation of refractive index of the diffraction grating 113 has a phase inversion portion. This configuration is suitable for implementation of the diffraction grating device 100 with the various characteristics as described above It is noted herein that the amplitude distribution $\Delta n(z)$ of the perturbation of refractive index of the diffraction grating 113 can take both positive and negative values, depending upon the position z, as indicated by above Eq (1b). Therefore, the phase inversion portion is defined by a transit point from positive to negative or from negative to positive in values of the amplitude distribution $\Delta n(z)$.

In the diffraction grating device 100 according to the present embodiment, preferably, the length 2d of the predetermined range where the perturbation of refractive index of the diffraction grating 113 is formed, is not more than 40 mm. This configuration makes the realization of the temperature regulating mechanism or temperature compensating mechanism much easier.

Furthermore, the maximum group delay difference caused by the reflection of light in the first band by the diffraction grating 113 is preferably not more than 10 ps and more preferably not more than 2.5 ps. The width $B_2$ of the second band is preferably not more than 1.6 nm and more preferably riot more than 0.8 nm. A multiplexer/demultiplexer module incorporating the diffraction grating device 100 wherein the maximum group delay difference is not more than 10 ps and wherein the width $B_2$ of the second band is not more than 1.6 nm, is suitably used in the optical transmission system performing the WDM transmission at the bit rate of 10 Gbps and with the wavelength spacing of 100 GHz. A multiplexer/demultiplexer module incorporating the diffraction grating device 100 wherein the maximum group delay difference is not more than 10 ps and wherein the width $B_2$ of the second band is not more than 0.8 nm, is suitably used in the optical transmission system performing the WDM transmission at the bit rate of 10 Gbps and with the wavelength spacing of 50 GHz. A multiplexer/demultiplexer module incorporating the diffraction grating device 100 wherein the maximum group delay difference is not more than 2.5 ps and wherein the width $B_2$ of the second band is not more than 1.6 nm, is suitably used in the optical transmission system performing the WDM transmission at the bit rate of 40 Gbps and with the wavelength spacing of 100 GHz. Further, a multiplexer/demultiplexer module incorporating the diffraction grating device 100 wherein the maximum group delay difference is not more than 2.5 ps and wherein the width $B_2$ of the second band is not more than 0.8 nm, is suitably used in the optical transmission system performing the WDM transmission at the bit rate of 40 Gbps and with the wavelength spacing of 50 GHz.

Next, the method of making the diffraction grating device 100 according to the present embodiment will be described.

Figure 2:
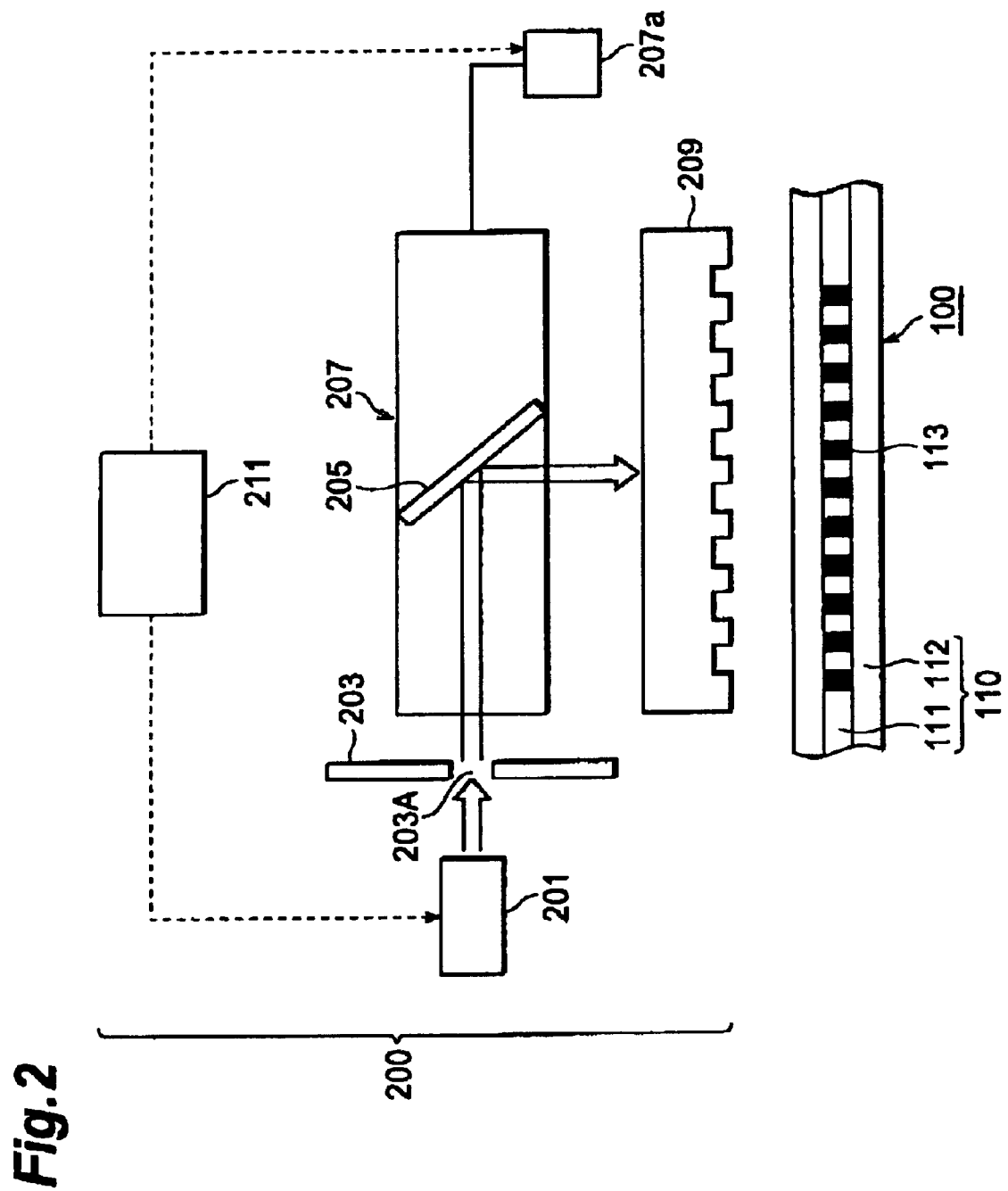
FIG. 2 is a diagram to illustrate a method of producing the diffraction grating device according to the present embodiment.

A production system 200 as shown in FIG. 2 is used for making the diffraction grating device 100. This system 200 is equipped with a laser source 201, a slit 203, a mirror 205, a stage 207 provided with a driving motor 207a, a phase grating 209, and a control unit 211.

The laser source 201 emits light to induce the perturbation of refractive index in the core region 111 of the optical fiber 110. An excimer laser source to emit ultraviolet laser light (e.g., a KrF excimer laser source or the like) can be suitably applied as the light source 201. This laser source 201 is tunable in intensity of output light.

The slit 203 allows light impinging on an aperture 203A out of the light emitted from the laser source 201 to pass through the aperture 203A and fall on the mirror 205. The mirror 205 reflects the light having passed through the aperture 203A of the slit 203, to make it incident on the phase grating 209. This mirror 205 is arranged to be movable in the longitudinal direction of the optical fiber 110 by the stage 207 having the driving motor 207a. By moving the mirror 205 in this way, it is feasible to scan in the longitudinal direction of the optical fiber 110 with the light emitted from the laser source 201 to the phase grating 209 and make the light incident into the optical fiber.

The phase grating 209 has projections and depressions of a definite period in a side opposite to the incidence side of the light reflected by the mirror 205 (i.e., in the side where the optical fiber is placed), and diffracts the incident light. Then the phase grating 209 forms interference fringes between +1st-order diffracted light and −1st-order diffracted light and thus forms the perturbation of refractive index according to the interference fringes in the optical waveguide region of the optical fiber 110. The optical fiber 110 with the perturbation of refractive index formed in the optical waveguide region is the diffraction grating device 100.

The control unit 211 is comprised of a CPU, a memory storing control programs, and so on. This control unit 211 is electrically coupled to the laser source 201 and controls the intensity of the light emitted from the laser source 201. The control unit 211 is also electrically coupled to the driving motor 207a of the stage 207 and controls the moving speed of the mirror 205.

In the production of the diffraction grating device 100 using the above-stated system 200, the optical fiber 110 in which the diffraction grating 113 is to be formed, is first placed immediately below the phase grating 209. The optical fiber 110 has the core region 111 in the central area, and the cladding region 112 surrounding the core region 111. Light guided through the optical fiber 110 propagates as confined in the core region 111, and part of energy of the light also exists in the cladding region 112 in the vicinity of the core region 111. Namely, the optical waveguide region of the optical fiber 110 includes the core region 111 and the cladding region 112 in the vicinity of the core region 111. The optical fiber 110 is made of silica glass as a principal component and the optical waveguide region (at least the core region) contains an additional component of $GeO_2$.

This optical fiber 110 is next exposed, for example, to the ultraviolet laser light of the wavelength of 248 nm outputted from the KrF excimer laser source 201, through the phase mask 209 with the phase modulation of the predetermined period. Then the refractive index is modulated in the $GeO_2$-doped region according to irradiation intensities, thereby forming the perturbation of refractive index of the predetermined period Λ During the exposure to the ultraviolet laser light, the control unit 211 controls the laser source 201 and the driving motor 207a, based on the amplitude distribution Δn(z) of the perturbation of refractive index designed by the method described hereinafter, to adjust the intensity of the light emitted from the laser source 201 and the moving speed of the mirror 205 so as to properly control a distribution of irradiation times or irradiation intensities along the longitudinal direction of the optical fiber 110, thereby forming the desired diffraction grating 113.

Figure 3:
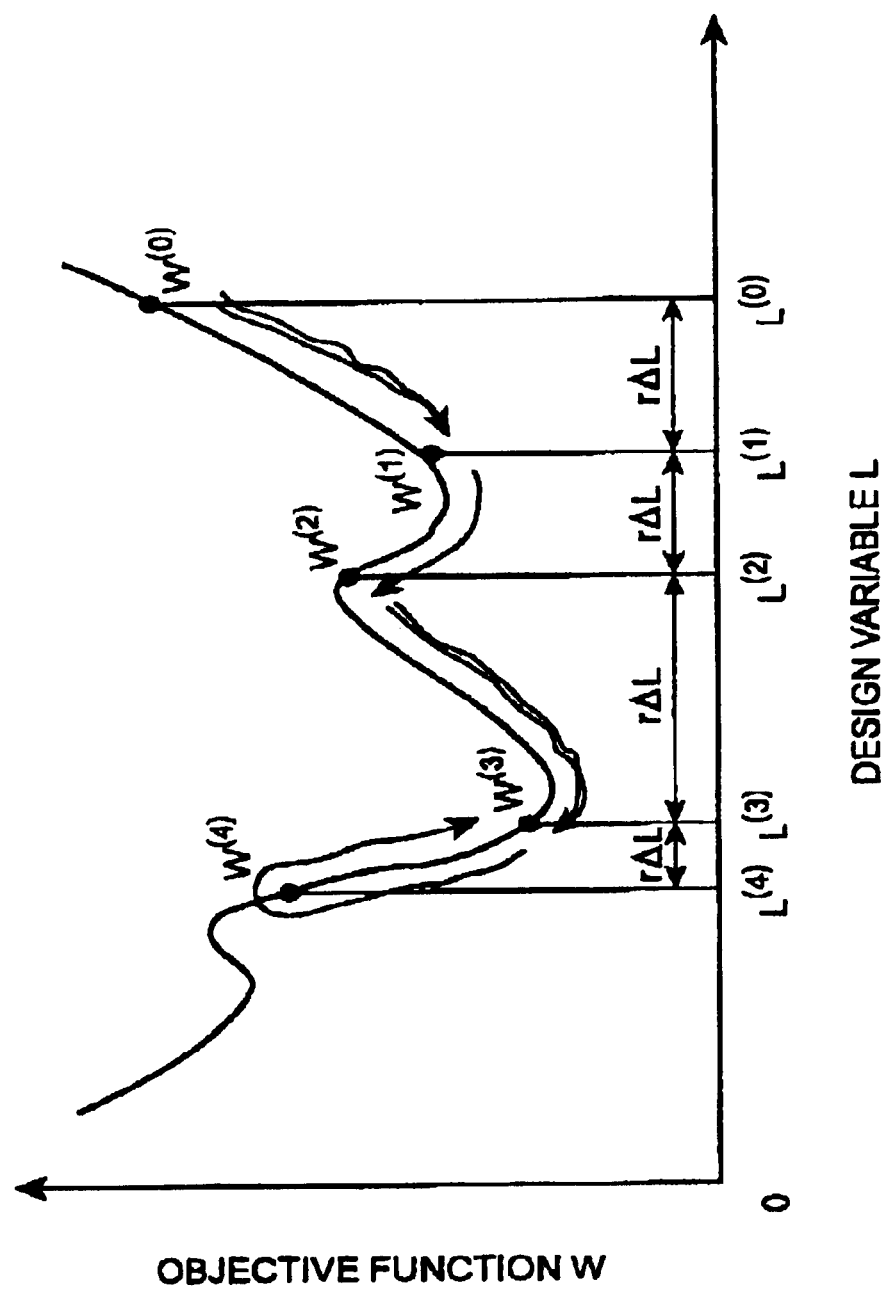
FIG. 3 is a diagram to illustrate a simulated annealing method.

The following will describe the method of designing the amplitude distribution Δn(z) of the perturbation of refractive index. The amplitude distribution Δn(z) of the perturbation of refractive index is designed by nonlinear programming. The nonlinear programming is, for example, based on Simulated Annealing or the genetic algorithms. The simulated annealing method out of them will be described below with reference to FIG. 3.

The simulated annealing method is a method of performing a search for a design variable L, continuing the search while an objective function W decreases, and allowing the search at a certain probability even after W turns to increase, thereby finding a minimum in a range as wide as possible. By gradually decreasing the probability of the allowance, we can find a global minimum, i.e., an optimal solution. As described, the present method is a technique of varying the probability of employing a worse solution (to increase the objective function W), using a parameter called temperature.

The first step is to perform analysis on the characteristics of the diffraction grating of an initial design $L^{(0)}$ and calculate an objective function $W^{(0)}$ (step S1). The next step is to vary the design variable $L^{(0)}$ by rΔL ($L^{(1)}=L^{(0)}+rΔL$) and calculate an objective function $W^{(1)}$ at $L^{(1)}$ (step S2). Here r is a random number [−1, 1]. If the design variable L is further changed by rΔL (to equal $L^{(2)}$, $W^{(2)}$ becomes greater than $W^{(1)}$. However, let us suppose that the design variable $L^{(2)}$ is allowed at a probability P represented by Eq (2) below (step S3).

$$P = \exp\{-(W^{(2)} - W^{(1)})/T\} > r^* \quad (2)$$

Here $r^*$ is a random number [0, 1], and T a temperature parameter. Although the objective function does not decrease, the search is allowed to climb a hill of the objective function at a certain probability, as described above.

When the design variable $L^{(2)}$ is further changed by $r\Delta L$ (to equal $L^{(3)}$), $W^{(3)}$ becomes smaller than $W^{(2)}$ and thus the search is successful (step S4). If the design variable $L^{(3)}$ is further changed by $r\Delta L$ (t equal $L^{(4)}$), $W^{(4)}$ becomes greater than $W^{(3)}$. The hill climbing probability calculated in this case is smaller than the random number $r^*$ and thus the search is assumed as unsuccessful, to return to $L^{(3)}$ (step S5).

The above steps are repeated a predetermined number of times $(N_s)$ and thereafter repeated calculation is performed with a decreased chop width $\Delta L$ of size (step S6). After the above repeated calculation is performed $N_t$ times, i.e., after completion of $N_s \times N_t$ searches, the parameter T is decreased (to narrow the permissible range of success in search at step S3), and then the search process returns to step S1. When the number of repetitions becomes greater than a specified value, a solution acquired at that point is assumed as a final solution, and the search is ended (step S7).

When the value of the objective function W becomes worse to make $W^{(2)}$ greater than $W^{(1)}$ as at step S3, since the following relation holds:

$$0 < T^{(k+1)} < T^{(k)} \quad (3)$$

where $T^{(k)}$ is a temperature before the change of Eq (2) and $T^{(k+1)}$ a temperature after the change, the following relation is derived.

$$0 < \exp\{-(W^{(2)} - W^{(1)})/T^{(k+1)}\} < \exp\{-(W^{(2)} - W^{(1)})/T^{(k)}\} < 1 \quad (4)$$

Therefore, even with the same deterioration amount $(W^{(2)} - W^{(1)})$ of the objective function W, the probability of employing the solution thereof is set larger in the case of a higher temperature, and the probability of employing the solution is set smaller in the case of a lower temperature. Namely, the temperature is set high in the initial stage in the simulated annealing method, thereby avoiding being trapped by an undesired local optimal solution. Then the temperature is gradually lowered with progress in calculation to decrease the probability of acquiring a worse solution, thereby finishing up with a global optimal solution.

The following will describe a method of actually designing the amplitude distribution $\Delta n(z)$ of the perturbation of refractive index, based on the simulated annealing method as described.

Figure 4A:
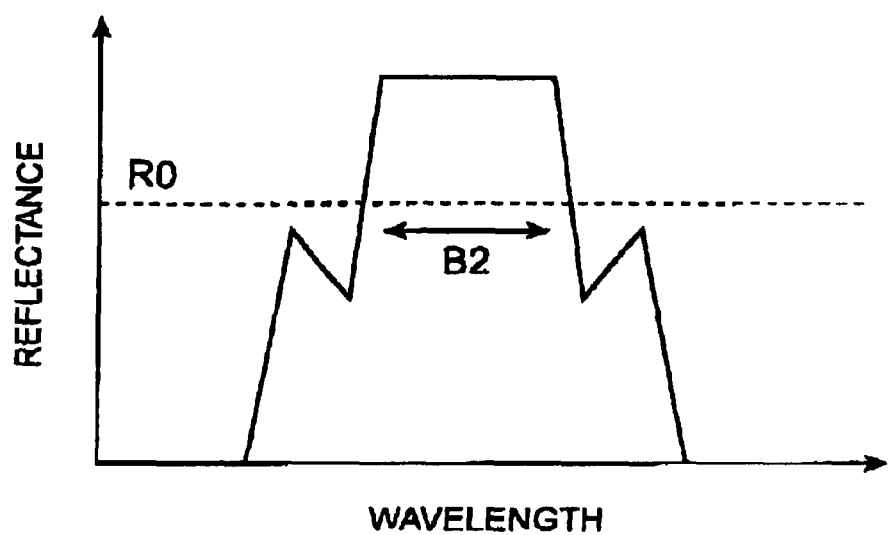
FIGS. 4A and 4B are diagrams to show discontinuously varying states of the width B2 of the second band.
Figure 4B:
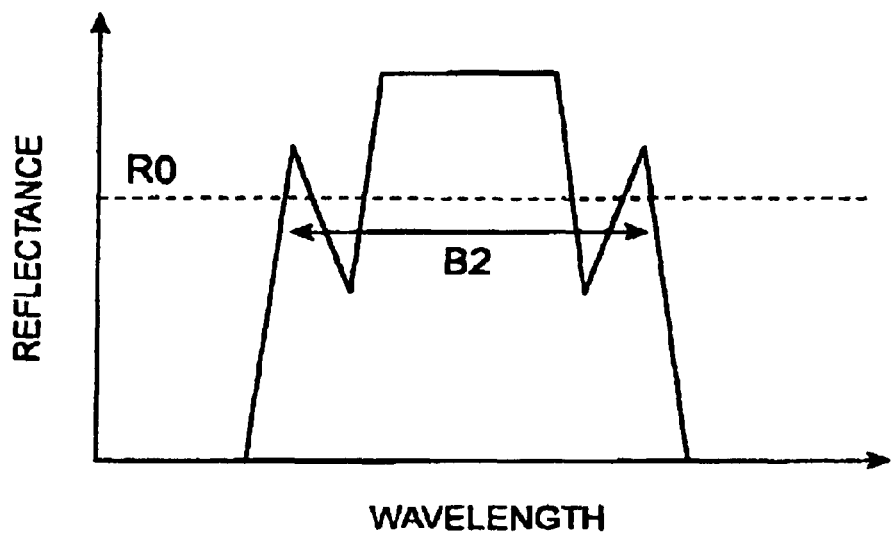

Let B1 be the width of the first band, B2 be the width of the second band, and T0 and R0 be a target transmittance and a target reflectance, respectively. Primarily, B1 indicates a maximum continuous wavelength band for which the transmittance is not more than T0, and B2 a wavelength band between a maximum wavelength and a minimum wavelength out of wavelengths for which the reflectance is R0 Particularly, concerning B2, however, where side lobes grow in the process of the design search, it can undergo discontinuous change, as shown in FIGS. 4A and 4B. This discontinuity makes optimization of design difficult, and thus the following technique is employed.

Letting C1 be a target band corresponding to the width of the first band and C2 be a target band corresponding to the width of the second band, optimization is carried out to satisfy the conditions: (1) the transmittance is not more than T0 in C1, (2) the reflectance is not more than R0 outside C2, and (3) the maximum group delay difference is as small in C1 as possible. Here definitions of C1, C2 are different from those of B1, B2, and there hold the following relations: C1<B1 and C2 >B2. In view of (3), however, the smaller B1/B2, i.e., the condition of C1=B1 and C2=B2, is more advantageous, which is the case in Examples described below.

A specific example of the objective function W is given, for example, by the equation below, where C1 and C2 are fixed in the optimization, (1) the maximum transmittance in C1 is $T_{max}$, (2) the maximum reflectance outside C2 is $R_{max}$, and (3) the maximum group delay difference in C1 is $\tau_{max}$:

$$W = (T_{max} - T0)^2 + (R_{max} - R0)^2 + (\tau_{max}^2) \times \omega \quad (5)$$

Here $\omega$ indicates a weight, and it is desirable to set $\omega$ small (e.g., not more than 0.01) in the search for the design satisfying (3) under the constraints of (1) and (2).

There are other conceivable objectives and there are also, for example, such techniques as (4) side lobes (peaks outside C1) are made as small as possible, (5) a spectral profile as a target is first set and the sum of squares of differences between the target and actual values is minimized, (6) the maximum group delay difference $(\tau T_{max})$ of transmitted waves outside C2 is also made small, and so on.

In Examples below, the optimization is carried out using the objective function W defined below, under the constraints of (1), (2), (3), and (6).

$$W = (T_{max} - T0)^2 + (R_{max} - R0)^2 + (\tau_{max}^2 + \tau T_{max}^2) \times \omega \quad (6)$$

Figure 5A:
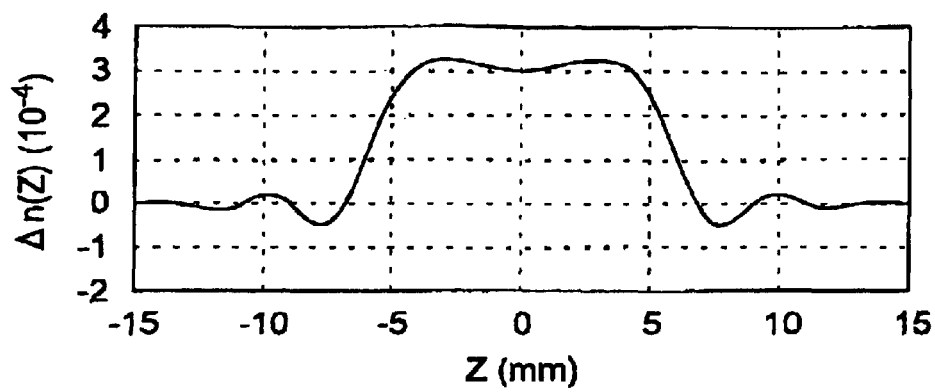
FIGS. 5A–C are graphs to show various characteristics of the diffraction grating device in Example 1.
Figure 5B:
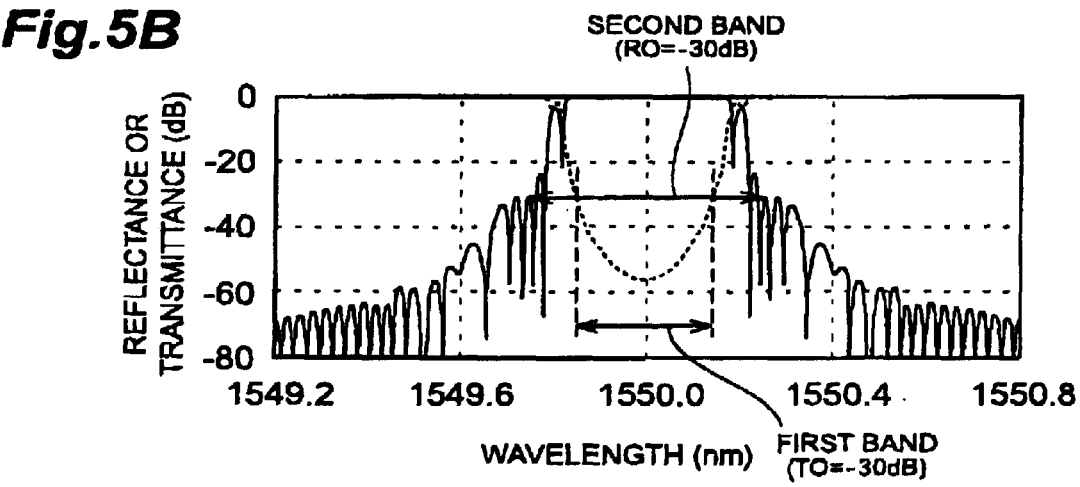
Figure 5C:
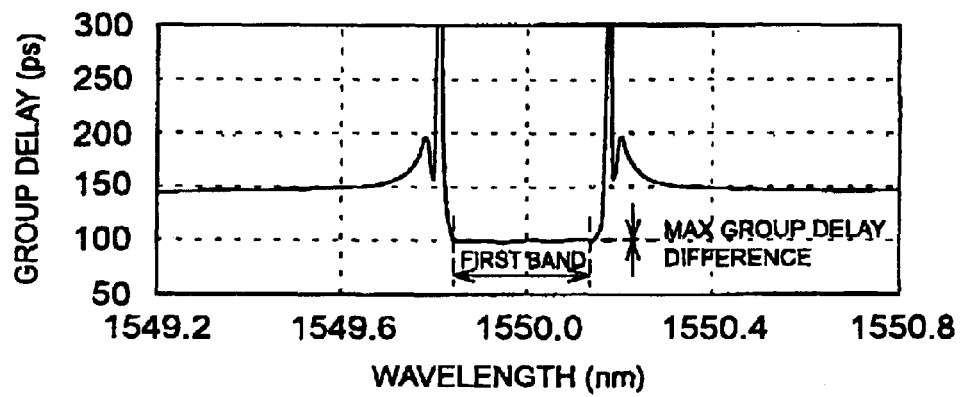
Figure 6A:
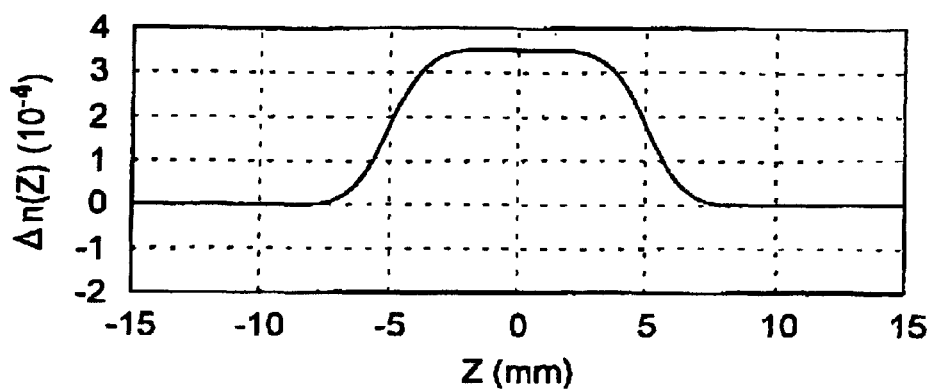
FIGS. 6A–C are graphs to show various characteristics of the diffraction grating device in Comparative Example 1.
Figure 6B:
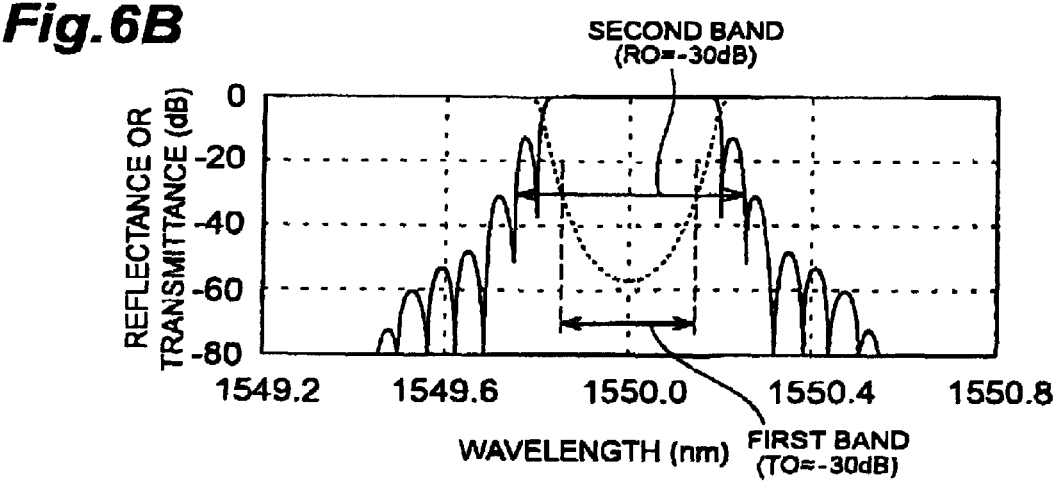
Figure 6C:
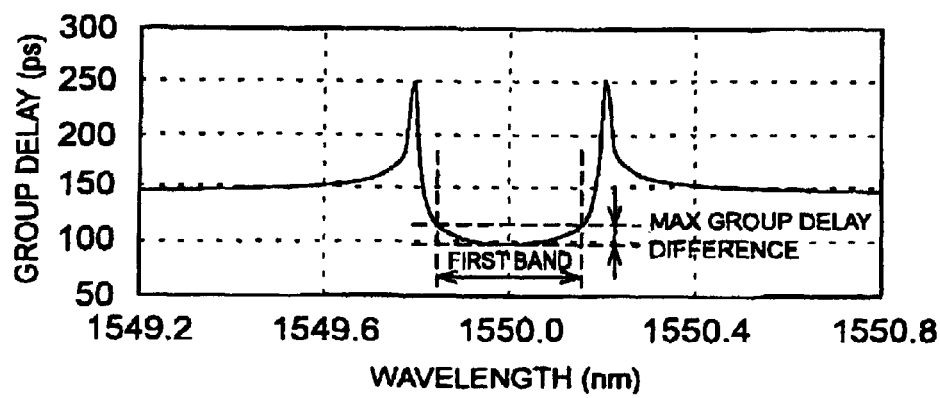
Figure 7A:
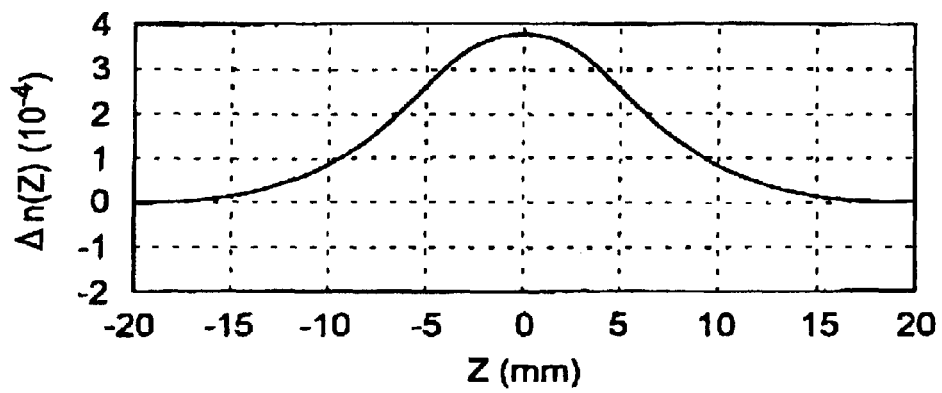
FIGS. 7A–C are graphs to show various characteristics of the diffraction grating device in Comparative Example 2.
Figure 7B:
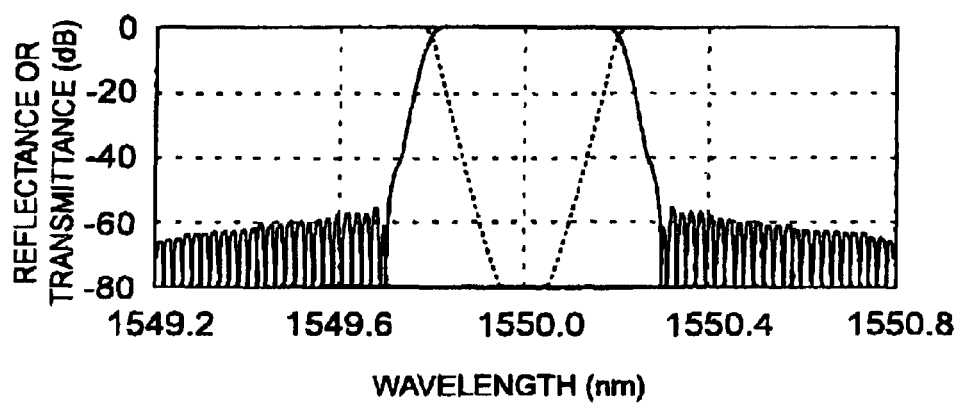
Figure 7C:
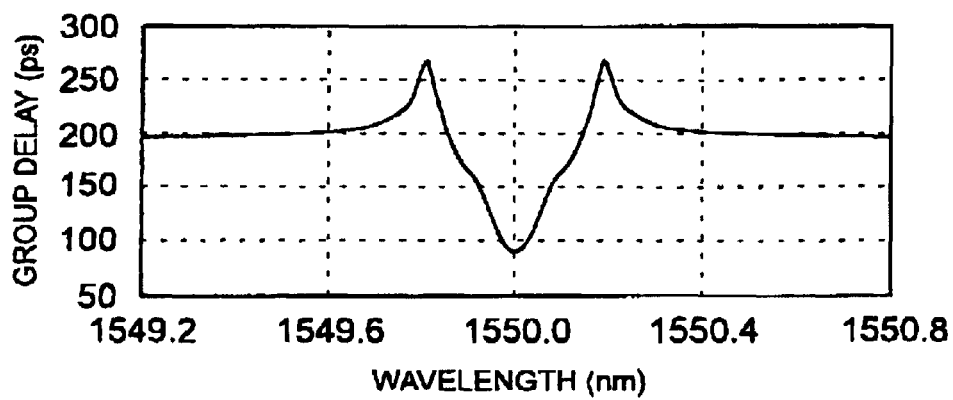

An example of the diffraction grating device 100 according to the present embodiment will be described below with two comparative examples. FIGS. 5A–C are graphs to show the various characteristics of the diffraction grating device of Example 1. FIGS. 6A–C are graphs to show the various characteristics of the diffraction grating device of Comparative Example 1. FIGS. 7A–C are graphs to show the various characteristics of the diffraction grating device of Comparative Example 2. Each FIG. A shows the amplitude distribution of the perturbation of refractive index of the diffraction grating, each FIG. B the reflection characteristics (solid line) and transmission characteristics (dashed line), and each FIG. C the maximum group delay difference characteristics caused by the reflection of light in the first band by the diffraction grating.

The diffraction grating device of Example 1 shown in FIGS. 5A–C is a device in which the amplitude distribution $\Delta n(z)$ of the perturbation of refractive index of the diffraction grating is represented by above Eq (1b) (FIG. 5A). This is based on the following values: $2d=30$ mm, $T_0=-30$ dB, $R_0=-30$ dB, $B_1/B_2 = 0.6$, $B_1+B_2=0.8$ nm, and K=10. In the diffraction grating device, the parameters $a_1-a_{10}$ in the amplitude distribution $\Delta n(z)$ of the perturbation of refractive index represented by Eq (1b) were designed by the simulated annealing method so that the objective function W represented by above Eq (6) became minimum under these conditions. The design of the parameters $a_1-a_{10}$ will be described below in more detail.

In the design of the parameters $a_1-a_{10}$, the first step is to set $a_1^{(0)}-a_{10}^{(0)}$ as the initial design variable $L^{(0)}$. In the design of $a_1^{(0)}-a_{10}^{(0)}$, three parameters a, b, and c of a super-Gaussian function represented by Eq (7) presented later, are optimized using above Eq (6). Then the parameters $a_1-a_{10}$ in Eq (1b) are determined so as to become nearest a distribution of the resultant super function. The Fourier transform is used for the determination of the parameters $a_1-a_{10}$. Then the parameters $a_1-a_{10}$ determined in this way become $a_1^{(0)}-a_{10}^{(0)}$ as the initial design variable $L^{(0)}$.

Then the parameters $a_1$–$a_{10}$ are optimized using Eq (6). First, the analysis is carried out on the characteristics of the diffraction grating of the initial design, using $a_1^{(0)}$–$a_{10}^{(0)}$, to obtain the objective function $W^{(0)}$. Then only $a_1^{(0)}$ is changed by $r\Delta a_1$ ($a_1^{(1)} = a_1^{(0)} + r\Delta a_1$), and the objective function $W^{(1)}$ is determined at $a_1^{(1)}$, and $a_2^{(0)}$–$a_{10}^{(0)}$. Then $W^{(1)}$ is compared with $W^{(0)}$ and the search is judged successful when $W^{(1)}$ is smaller or when Eq (2) is met. Next, only $a_2^{(0)}$ is changed by $r\Delta a_2$ and like judgment is made. This is repeated for $a_3^{(0)}$–$a_{10}^{(0)}$ to complete the searches for one step. The steps heretofore correspond to the above-stated steps up to step S5. Therefore, the number of searches at one temperature condition in the present example is $10 \times N_s \times N_t$ and the repeated calculation with decreasing temperature completes the optimization of the parameters $a_1$–$a_{10}$.

In the setting of the parameters $a_1$–$a_{10}$, as described above, the optimization of the parameters a, b, and c is carried out using the super-Gaussian function, the initial values $a_1^{(0)}$–$a_{10}^{(0)}$ in Eq (1b) are set using the thus optimized super-Gaussian function, and the optimization of the parameters $a_1$–$a_{10}$ is carried out using the initial values $a_1^{(0)}$–$a_{10}^{(0)}$. The reason why the optimization is carried out twice in this way is that the efficiency becomes higher by employing the method of performing the rough optimization using the super-Gaussian function with the smaller number of parameters and thereafter enhancing the accuracy with the increased number of parameters. The reason why the super-Gaussian function is employed is that it is adopted in design of many diffraction gratings and it facilitates the design. The initial values of the parameters a, b, and c used in the optimization of the super-Gaussian function can be readily set from the past experience.

In the above-stated setting of the parameters $a_1$–$a_{10}$, the initial temperature T was 10, the number of repetitions $N_o$ 10, $N_t$ 10, the temperature decrease rate 0.85, and the number of evaluations of the objective function W about 40000. The result obtained is as follows. $a_1 = 2.206 \times 10^{-4}$, $a_2 = 1.332 \times 10^{-4}$, $a_3 = 1.919 \times 10^{-5}$, $a_4 = -4.694 \times 10^{-5}$, $a_5 = -3.852 \times 10^{-5}$, $a_6 = 8.661 \times 10^{-6}$, $a_7 = 2.216 \times 10^{-5}$, $a_8 = -5.816 \times 10^{-6}$, $a_9 = -6.330 \times 10^{-6}$, and $a_{10} = 1.447 \times 10^{-6}$.

The diffraction grating device of Comparative Example 1 shown in FIGS. 6A–C is a device in which the amplitude distribution $\Delta n(z)$ of the perturbation of refractive index of the diffraction grating is represented by the following equation.

$$\Delta n(z) = a \exp(-|z/b|^c) \quad (7)$$

The following conditions were also employed herein: $T_0 = -30$ dB, $R_0 -30$ dB, $B_1/B_2 = 0.6$, and $B_1 + B_2 = 0.8$ nm. In Comparative Example 1, the amplitude distribution $\Delta n(z)$ of the perturbation of refractive index was of the super-Gaussian function type (FIG. 6A) with $a = 3.533 \times 10^{-4}$, $b = 5.483$ mm, and $c = 5.059$.

The diffraction grating device of Comparative Example 2 shown in FIGS. 7A–C is also a device in which the amplitude distribution $\Delta n(z)$ of the perturbation of refractive index of the diffraction grating is represented by above Eq (7). The conditions set herein were also as follows: $T_0 = -30$ dB, $R_0 = -30$ dB, $B_1/B_2 = 0.6$, and $B_1 + B_2 = 0.8$ nm. In Comparative Example 2, the amplitude distribution $\Delta n(z)$ of the perturbation of refractive index was of a Gaussian function type (FIG. 7A) with $a = 3.780 \times 10^{-4}$, $b = 8.178$ mm, and $c = 2$.

The following can be derived from comparison among Example 1 (FIGS. 5A–C), Comparative Example 1 (FIGS. 6A–C), and Comparative Example 2 (FIGS. 7A–C). The examples agree in that $T_0 = -30$ dB, $R_0 = -30$ dB, $B_1/B_2 = 0.6$, and $B_1 + B_2 = 0.8$ nm. However, the maximum group delay difference in the first band, which is caused by the reflection of light in the first band by the diffraction grating, is 1.7 ps in Example 1 (FIGS. 5A–C), 17 ps in Comparative Example 1 (FIGS. 6A–C), and 103 ps in Comparative Example 2 (FIGS. 7A–C). As seen, the maximum group delay difference in the first band in Example 1 is one tenth of that in Comparative Example 1 and one sixtieth of that in Comparative Example 2.

Figure 8:
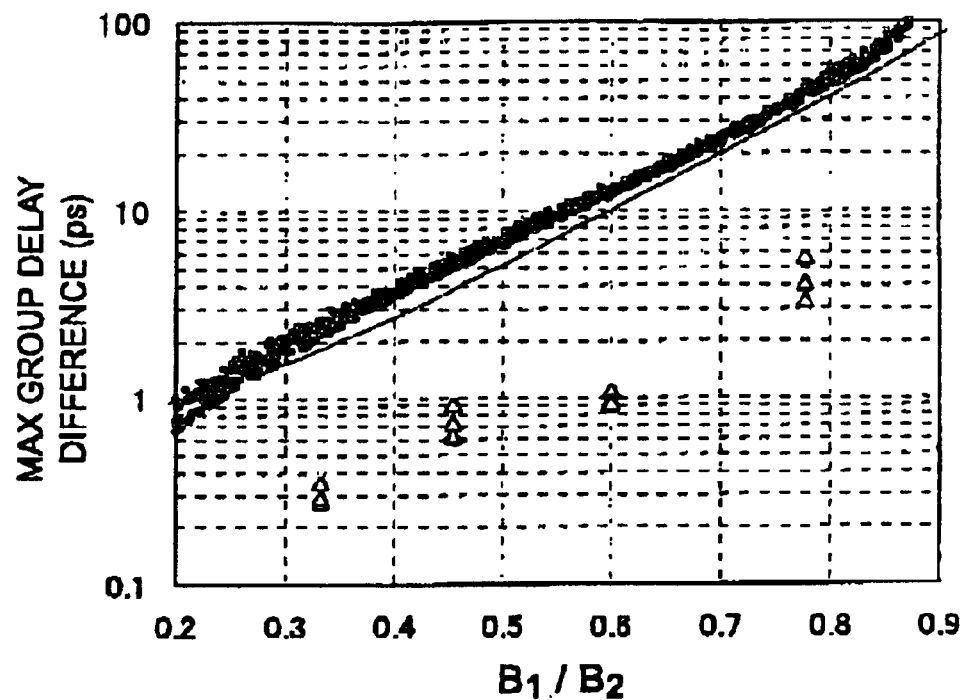
FIG. 8 is a graph to show the relation between the maximum group delay difference in the first band and the ratio ($B_1/B_2$) in the diffraction grating devices of respective Examples and Comparative Examples.
Figure 9:
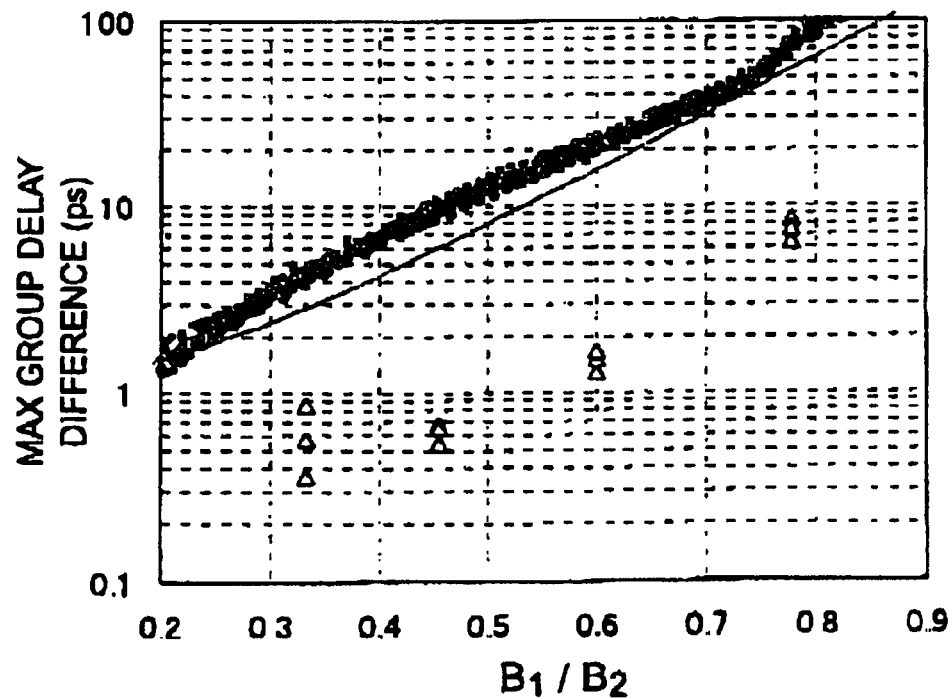
FIG. 9 is a graph to show the relation between the maximum group delay difference in the first band and the ratio ($B_1/B_2$) in the diffraction grating devices of respective Examples and Comparative Examples.

Each of FIG. 8 and FIG. 9 is a graph to show the relation between the maximum group delay difference in the first band and the ratio ($B_1/B_2$) in the diffraction grating devices of respective Examples and Comparative Examples including above-stated Example 1 and Comparative Examples 1, 2.

In these figures, marks $\Delta$ indicate points of the relation between the maximum group delay difference in the first band and the ratio ($B_1/B_2$) in the diffraction grating devices of Examples in which the amplitude distribution of the perturbation of refractive index of the diffraction grating is represented by above Eq (1b). In these Examples, the conditions were the fixed conditions that $2d = 30$ mm, $B_1 + B_2 = 0.8$ nm, and $K = 10$ and the condition that the ratio ($B_1/B_2$) was set at different values, and the parameters $a_1$–$a_{10}$ were designed by the simulated annealing method so that the objective function W represented by above Eq (6) became minimum under these conditions. FIG. 8 shows the results with $T_0 = -20$ dB and $R_0 = 20$ dB, and FIG. 9 the results with $T_0 = -30$ dB and $R_0 = -30$ dB.

Marks ○ indicate points of the relation between the maximum group delay difference in the first band and the ratio ($B_1/B_2$) in the diffraction grating devices of Comparative Examples in which the amplitude distribution of the perturbation of refractive index of the diffraction grating is represented by above Eq (7). In this case, under the fixed condition of $B_1 + B_2 = 0.8$ nm, a million ways of design were performed for the combination of parameters a, b, and c in above Eq (7) and a thousand ways of design from the smallest maximum group delay difference in the first band out of them, were presented in the drawings. FIG. 8 shows the results with $T_0 \leq -20$ dB and $R_0 = -20$ dB, and FIG. 9 the results with $T_0 \leq -20$ dB and $R_0 = -30$ dB. The solid lines shown in the respective graphs of FIG. 8 and FIG. 9 indicate the lower limit of the maximum group delay difference in the first band (i.e., $0.011 \times \exp(7.86 \times B_1/B_2 - 0.045 \times R_0)/B_1$) in the case of Comparative Examples where the ratio ($B_1/B_2$) is in the range of not less than 0.3.

As apparent from these FIG. 8 and FIG. 9, the larger the value of the ratio ($B_1/B_2$), the larger the maximum group delay difference in the first band is caused by the reflection of light in the first band by the diffraction grating, in all of Examples and Comparative Examples. At equal levels of values of the ratio ($B_1/B_2$), the maximum group delay differences in the first band in Examples are approximately one tenth of those in Comparative Examples.

When optical transmission is assumed to be performed at the bit rate of 10 Gbps, the maximum group delay difference in the first band, which is caused by the reflection of light in the first band by the diffraction grating, needs to be not more than 10 ps, in order to suppress the deterioration in the waveform of signal light. For this reason, in the case of Comparative Examples, the ratio ($B_1/B_2$) needs to be not more than about 0.56 in FIG. 8 and not more than about 0.50 in FIG. 9. In contrast to it, in the case of Examples, the ratio ($B_1/B_2$) can be not more than about 0.8. At equal levels of the maximum group delay difference in the first band caused by the reflection of light in the first band by the diffraction grating, as described above, the value of the ratio ($B_1/B_2$)

can be set larger in Examples than in Comparative Examples, and this is advantageous in terms of errors in the wavelengths of signal light and errors in production of the diffraction grating device.

Figure 10:
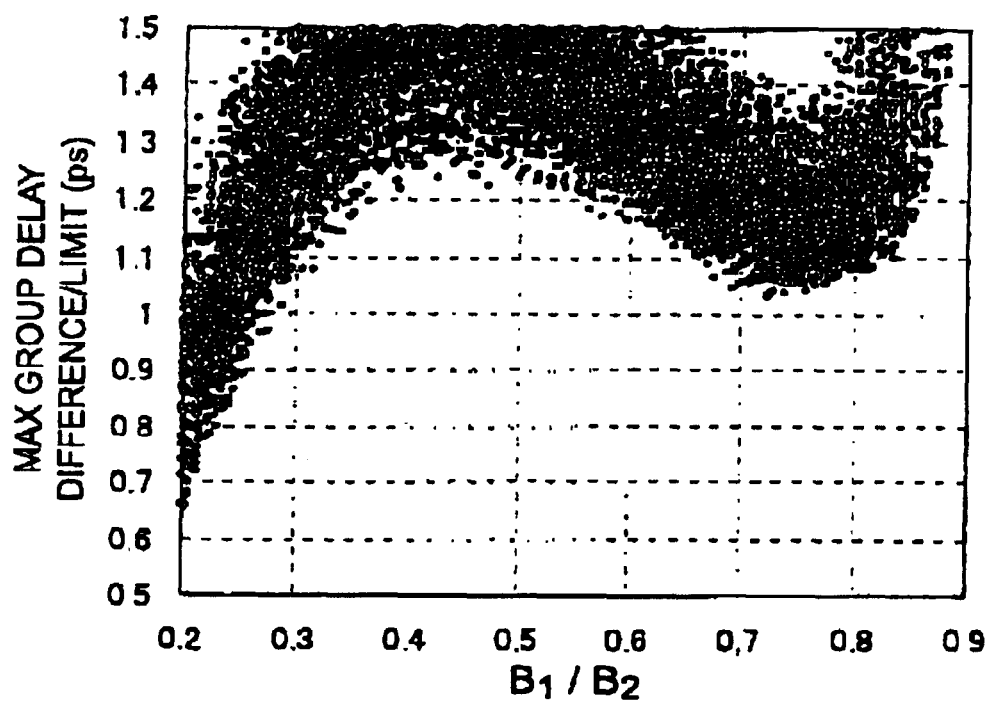
FIG. 10 is a graph to show the relation between the ratio of the maximum group delay difference in the first band to the limit value, and the ratio ($B_1/B_2$) in the diffraction grating devices of Comparative Example.

FIG. 10 is a graph to show the relation between the ratio of the maximum group delay difference in the first band to the limit, and the ratio ($B_1/B_2$) in the diffraction grating devices of Comparative Examples. The limit is represented by $0.011 \times \exp(7.86 \times B_1/B_2 - 0.045 \times R_0)/B_1$. In this case, under the fixed condition of $B_1+B_2=0.8$ nm, a million ways of design were performed for the combination of parameters a, b, and c in above Eq (7) to obtain the maximum group delay difference in the first band caused by the reflection of light in the first band by the diffraction grating, and values of the ratio of the maximum group delay difference to the limit were presented in the drawing. The conditions herein were $T_0 \leq -20$ dB and $R_0 \leq -20$ dB. It is apparent from this figure that in the diffraction grating devices of Comparative Examples the ratio of the maximum group delay difference in the first band, caused by the reflection of light in the first band by the diffraction grating, to the limit exceeds 1 in the range of the ratio ($B_1/B_2$) of not less than 0.3, and this means that the maximum group delay difference in the first band does not become below the limit.

Table 1 presents the width B1 of the first band, the width B2 of the second band, the ratio thereof B1/B2, the transmittance T0, the reflectance R0, and the maximum group delay difference in each of twenty four Examples indicated by the marks Δ in FIG. 8 and FIG. 9. FIGS. 11A–C to FIGS. 33A–C are graphs to show the various characteristics of the respective diffraction grating devices in these Examples. FIGS. 11A–C to FIGS. 29A–C are graphs equivalent to Examples No. 1–No. 19, respectively, presented in Table 1, and FIGS. 30A–C to FIGS. 33A–C graphs equivalent to Examples No. 21–No. 24, respectively, presented in Table 1. Example indicated by No. 20 in Table 1 corresponds to aforementioned Example 1, and the graphs to show the various characteristics of the diffraction grating device thereof are as presented in FIGS. 5A–C.

An embodiment of the multiplexer/demultiplexer module according to the present invention will be described below. The multiplexer/demultiplexer module 10 described below incorporates the diffraction grating 100 according to the aforementioned embodiment. In the following, the description will be given on the assumption that the light is M lightwaves of wavelengths $\lambda_1 - \lambda_M$ and that the diffraction grating device 100 selectively reflects light of a wavelength $\lambda_m$ out of them.

Figure 34:
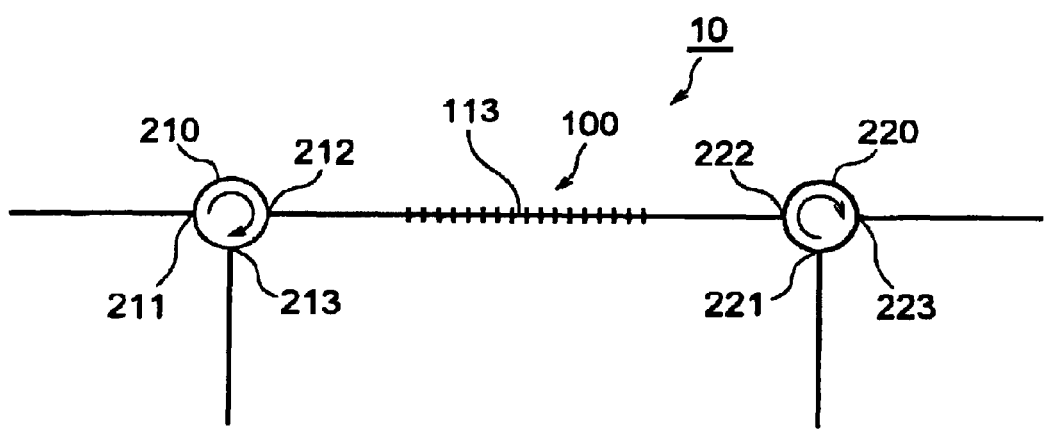
FIG. 34 is a schematic diagram of a multiplexer/demultiplexer module according to the present embodiment.

FIG. 34 is a schematic diagram of the multiplexer/demultiplexer module 10 according to the present embodiment. This multiplexer/demultiplexer module 10 is constructed in a configuration wherein an optical circulator 210 is coupled to one end of the diffraction grating device 100 and another optical circulator 220 is coupled to the other end of the diffraction grating device 100. The optical circulator 210 has a first port 211, a second port 212, and a third port 213 and is configured to output light entering the first port 211, from the second port 212 into the diffraction grating device 100 and output light entering the second port 212, from the third port 213. The optical circulator 220 has a first port 221, a second port 222, and a third port 223 and is configured to output light entering the first port 221, from the second port 222 into the diffraction grating device 100 and output light entering the second port 222, from the third port 223.

In the multiplexer/demultiplexer module 10, when light of the wavelengths $\lambda_1 - \lambda_{m-1}, \lambda_{m+1} - \lambda_M$ enters the first port 211 of the optical circulator 210, the light of these wavelengths is outputted from the second port 212 of the optical circulator 210 into the diffraction grating device 100, travels through the diffraction grating device 100, enters the second port 222 of the optical circulator 220, and is then outputted from the third port 223 of the optical circulator 220. When light of the wavelength $\lambda_m$ enters the first port 221 of the optical circulator 220, this light is outputted from the second port 222 of the optical circulator 220 into the diffraction grating device 100, is reflected by the diffraction grating device 100, enters the second port 222 of the optical

TABLE 1

Figure 11A:
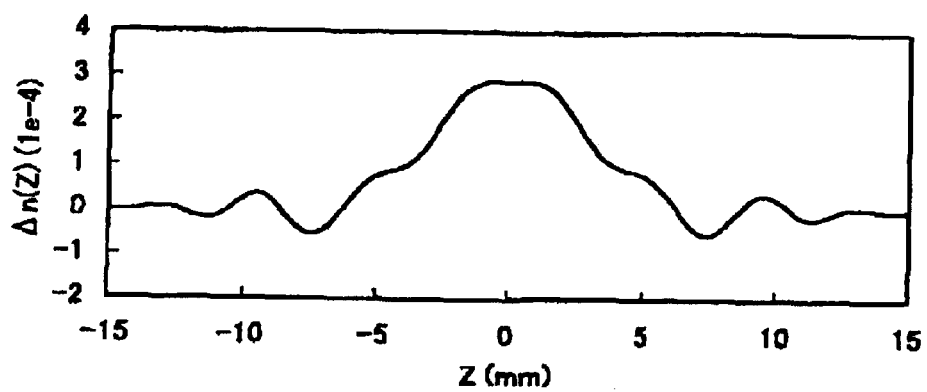
FIGS. 11A–C to FIGS. 33A–C are graphs to show the various characteristics of the diffraction grating devices of respective Examples.
Figure 11B:
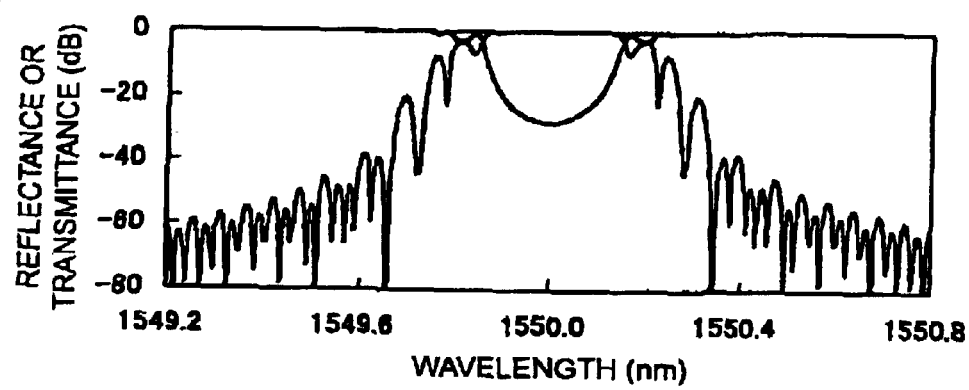
Figure 11C:
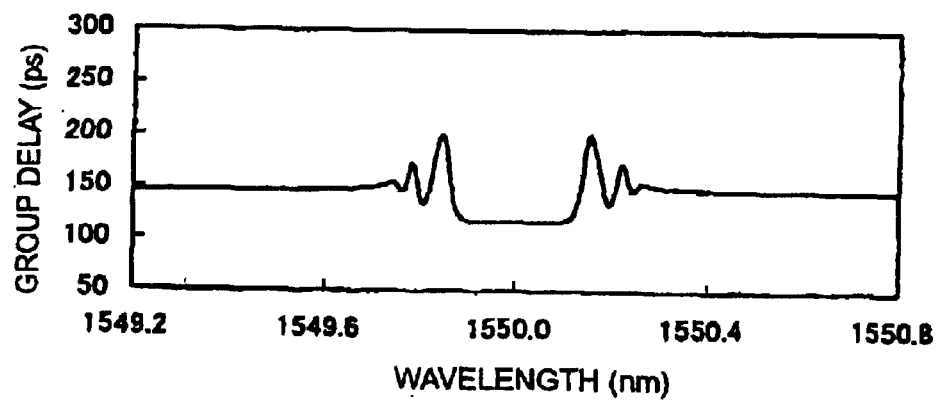
Figure 12A:
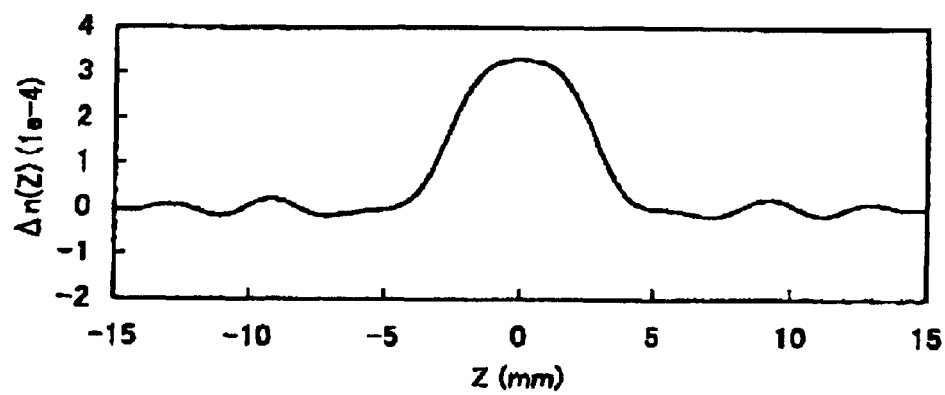
Figure 12B:
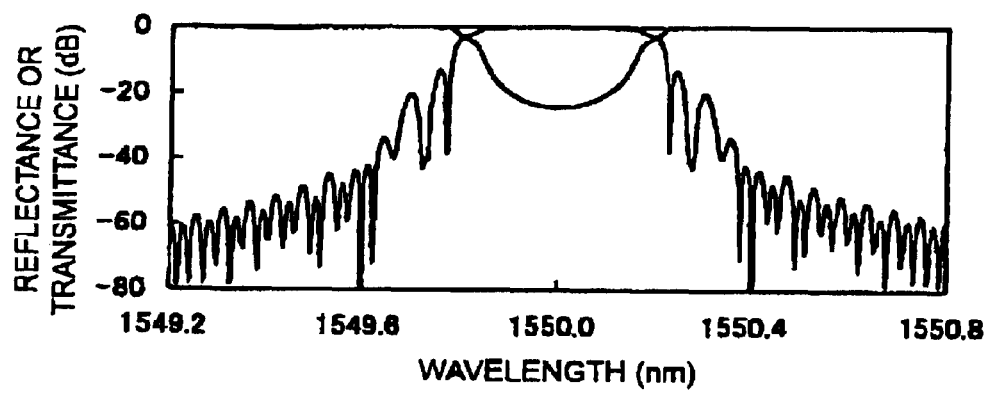
Figure 12C:
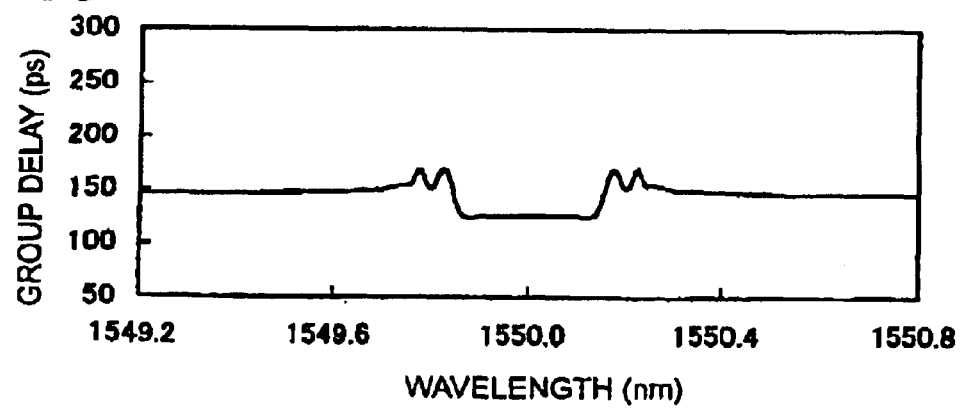
Figure 13A:
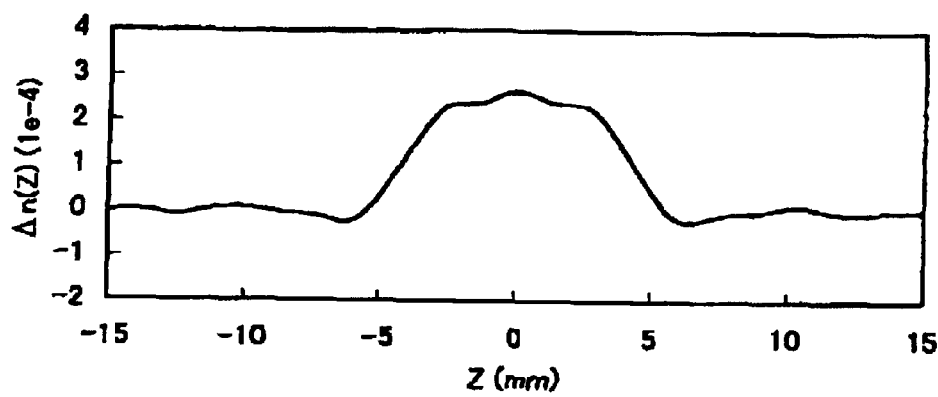
Figure 13B:
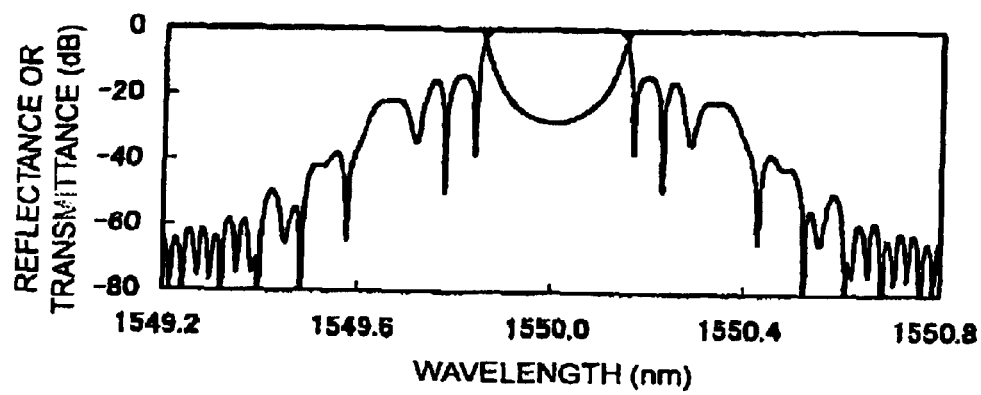
Figure 13C:
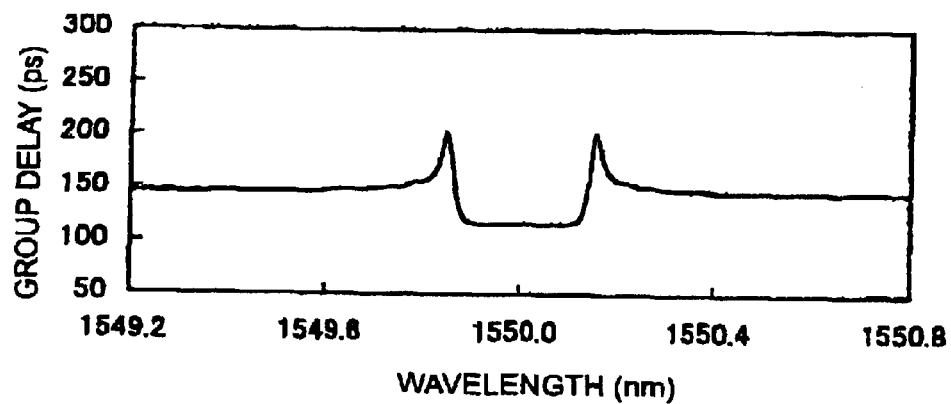
Figure 14A:
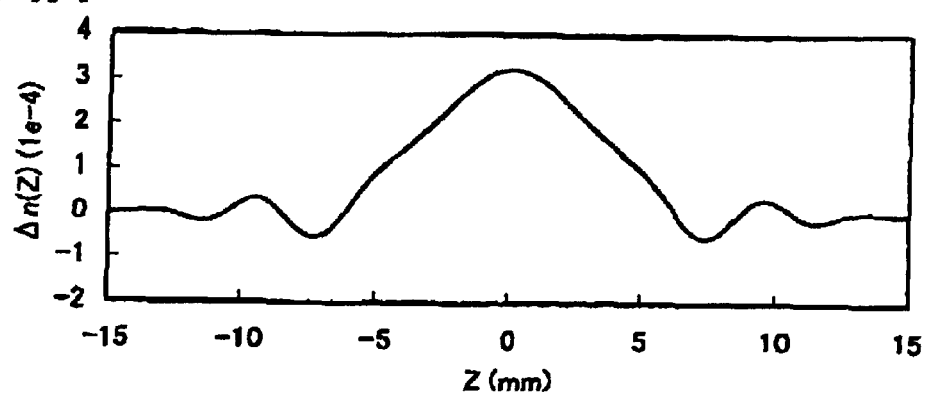
Figure 14B:
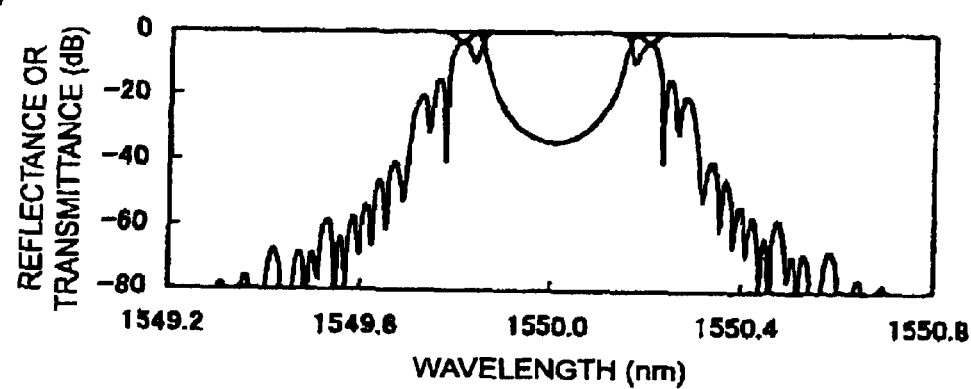
Figure 14C:
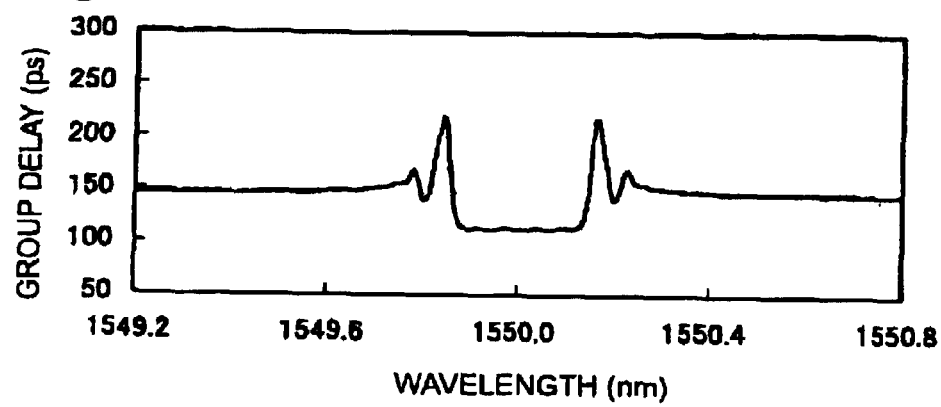
Figure 15A:
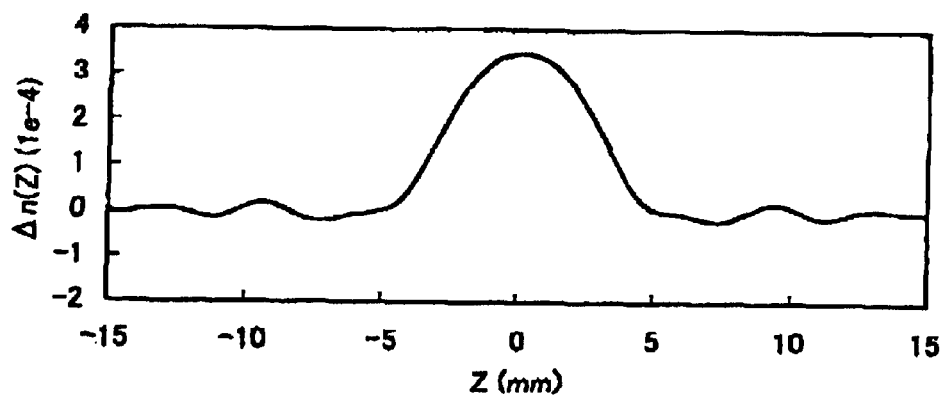
Figure 15B:
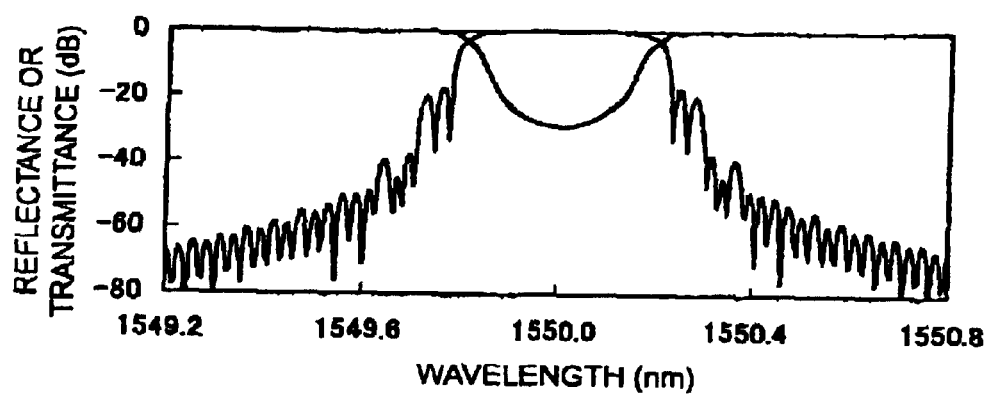
Figure 15C:
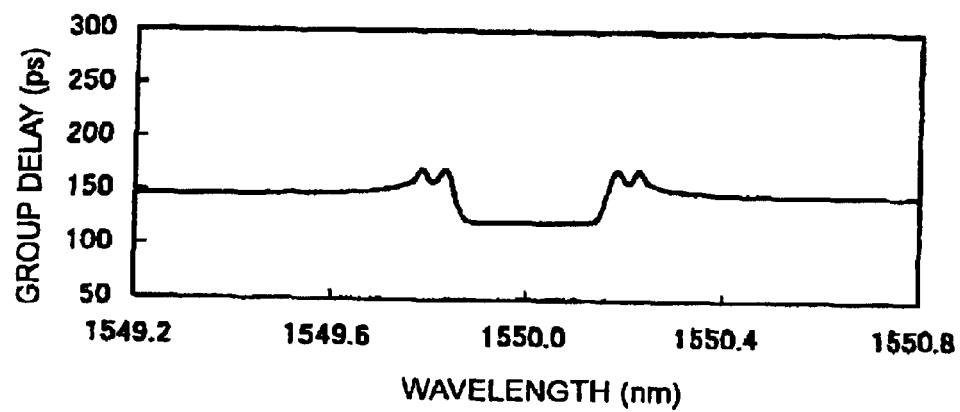
Figure 16A:
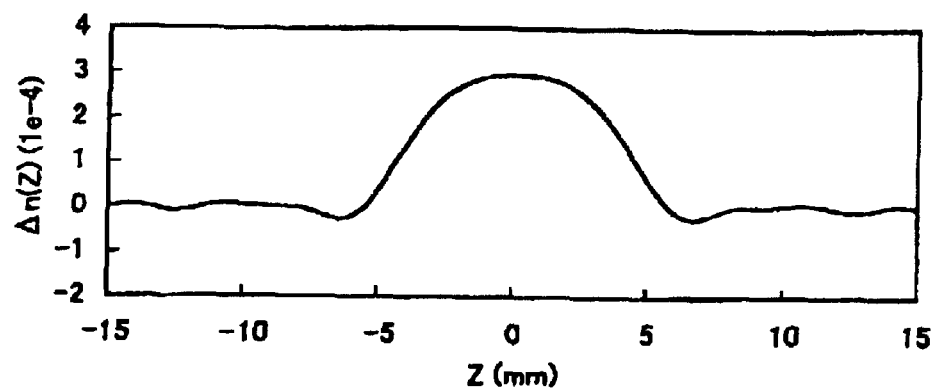
Figure 16B:
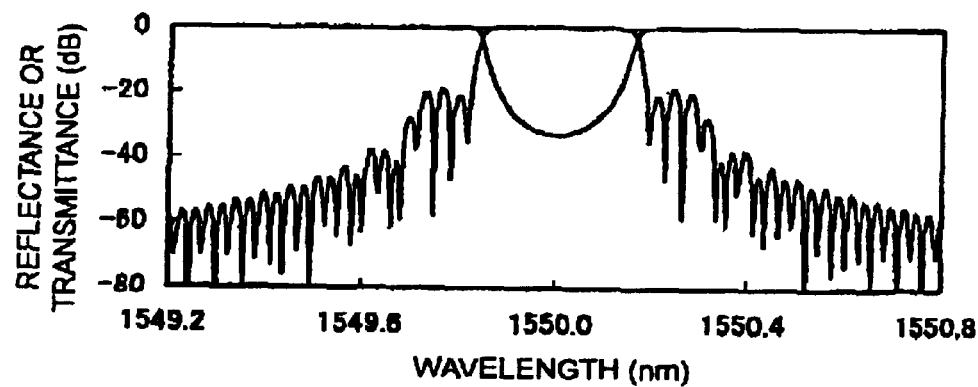
Figure 16C:
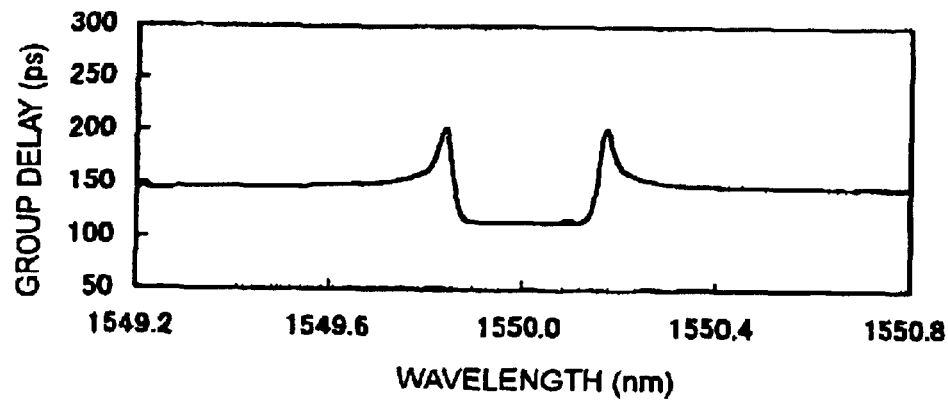
Figure 17A:
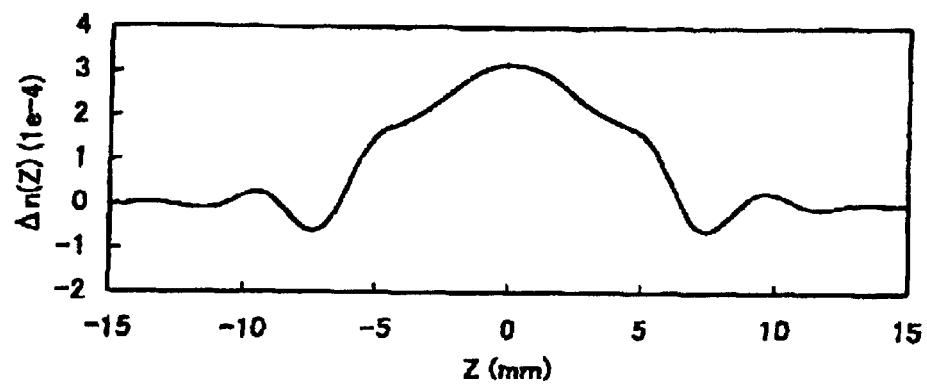
Figure 17B:
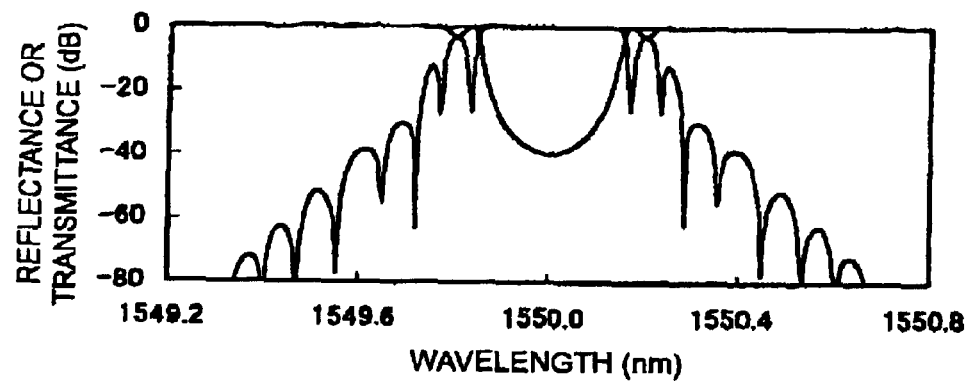
Figure 17C:
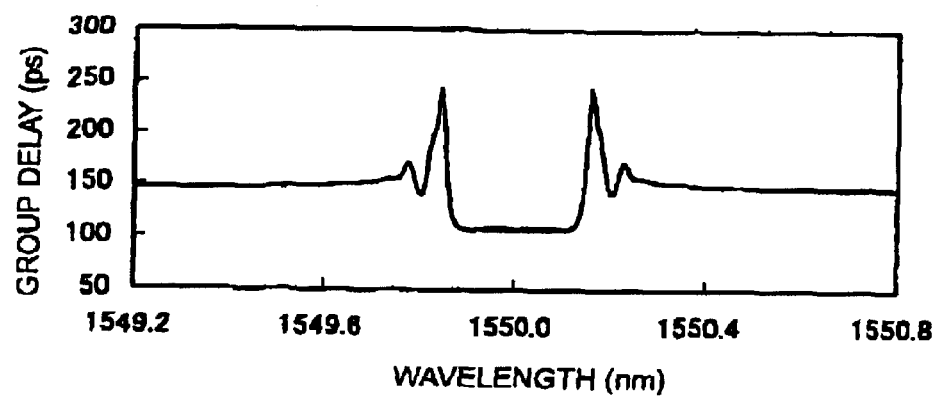
Figure 18A:
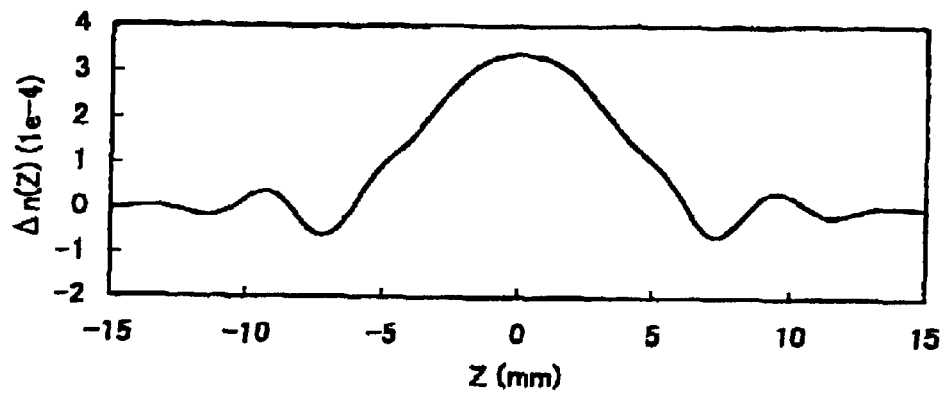
Figure 18B:
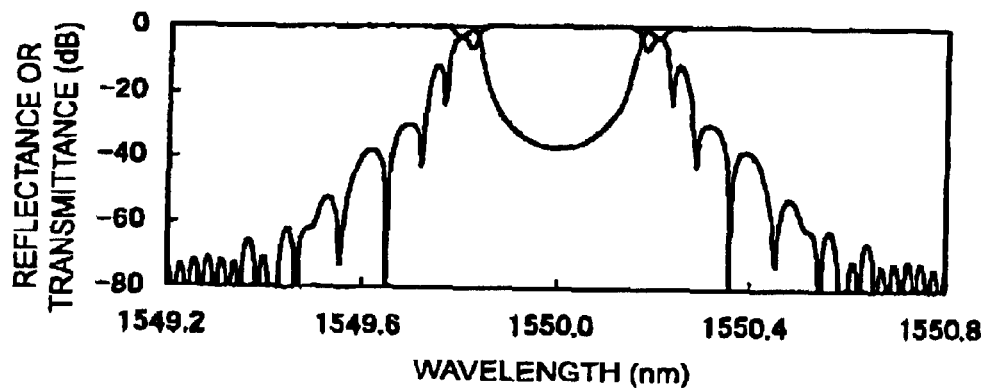
Figure 18C:
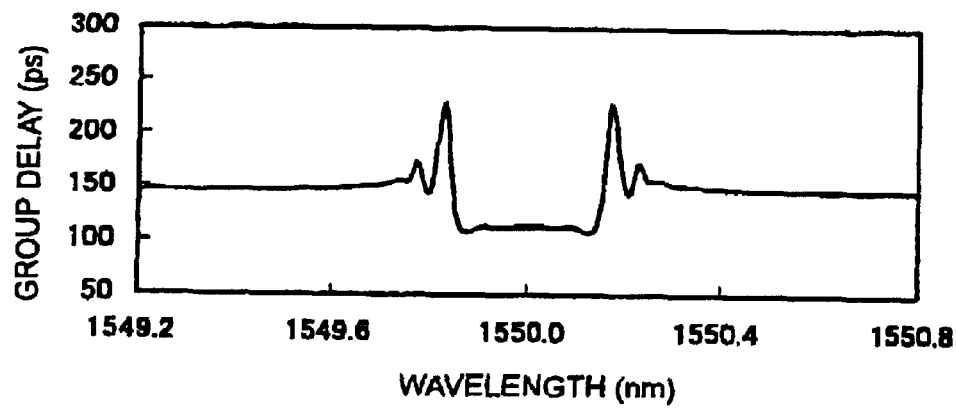
Figure 19A:
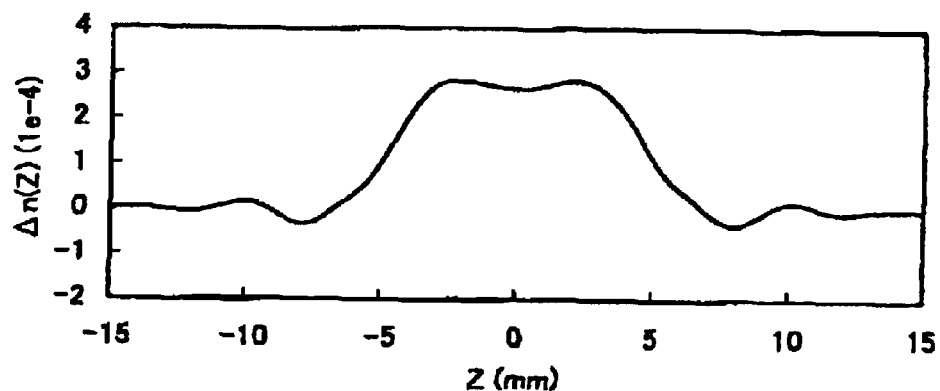
Figure 19B:
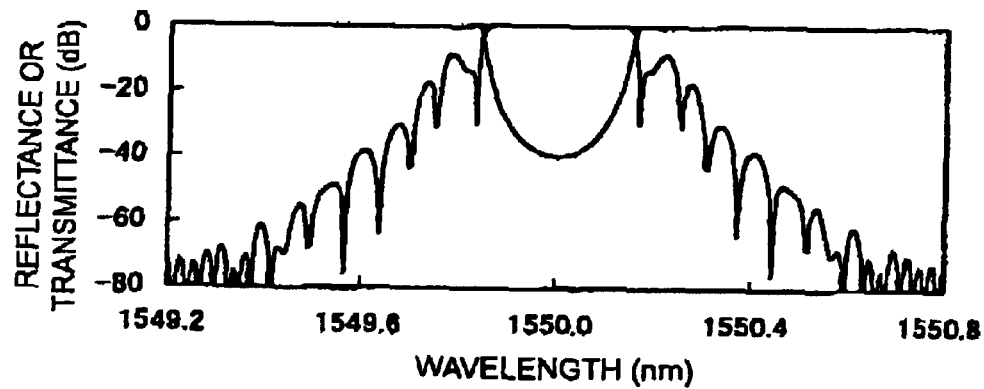
Figure 19C:
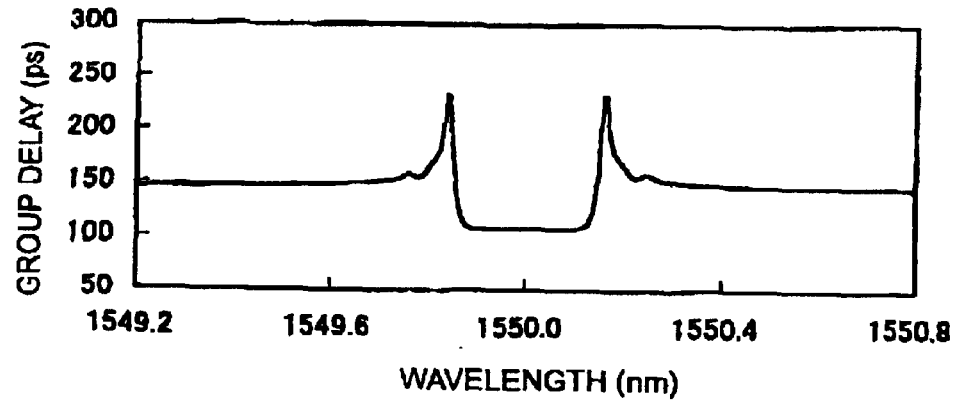
Figure 20A:
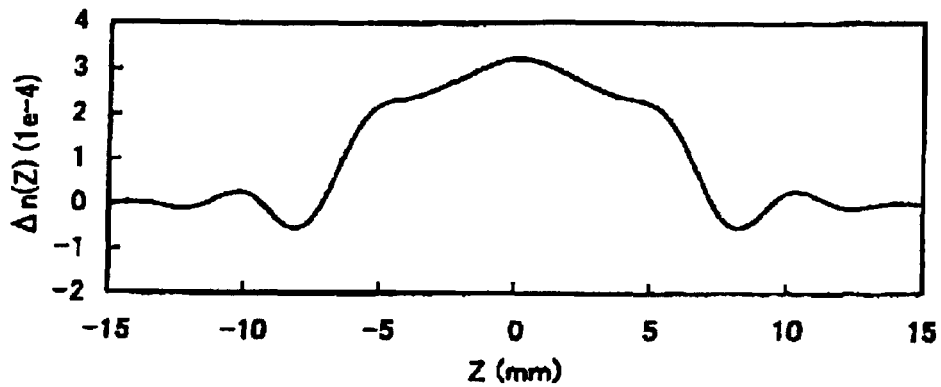
Figure 20B:
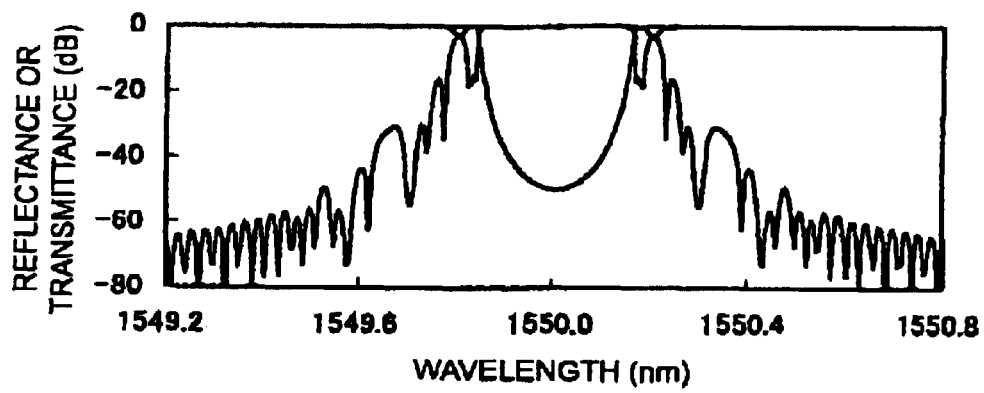
Figure 20C:
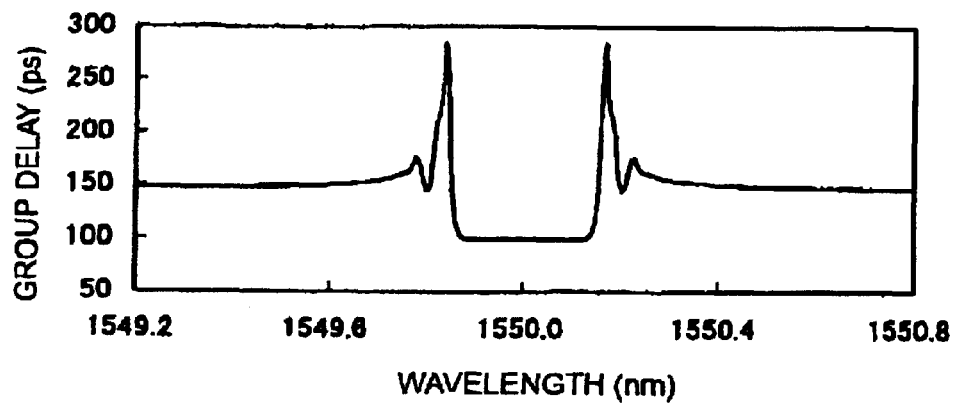
Figure 21A:
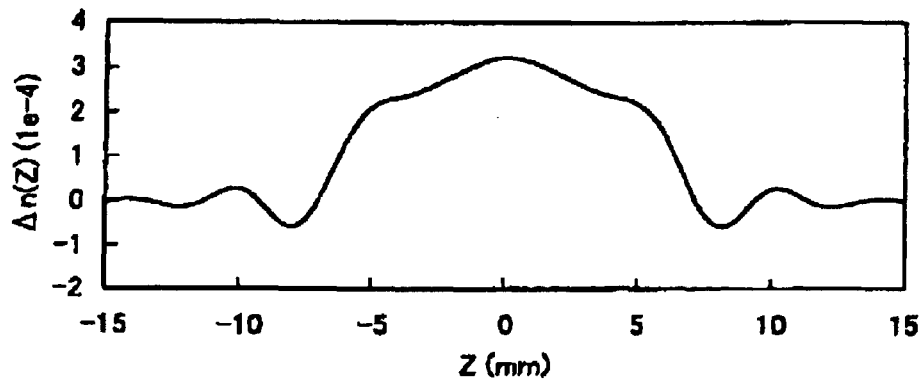
Figure 21B:
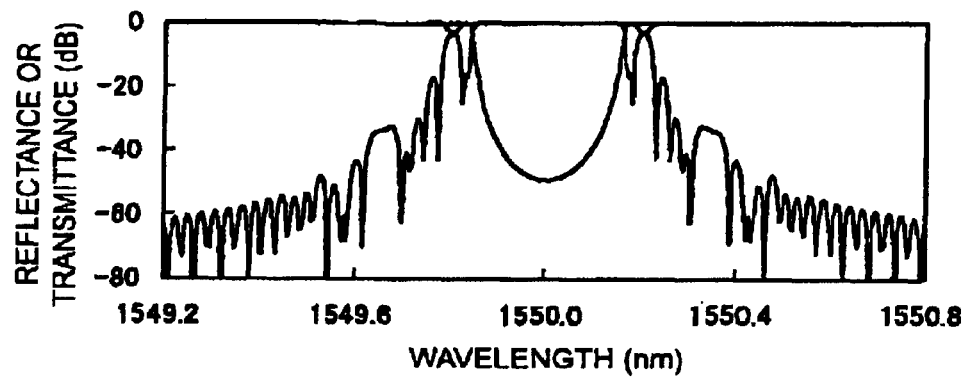
Figure 21C:
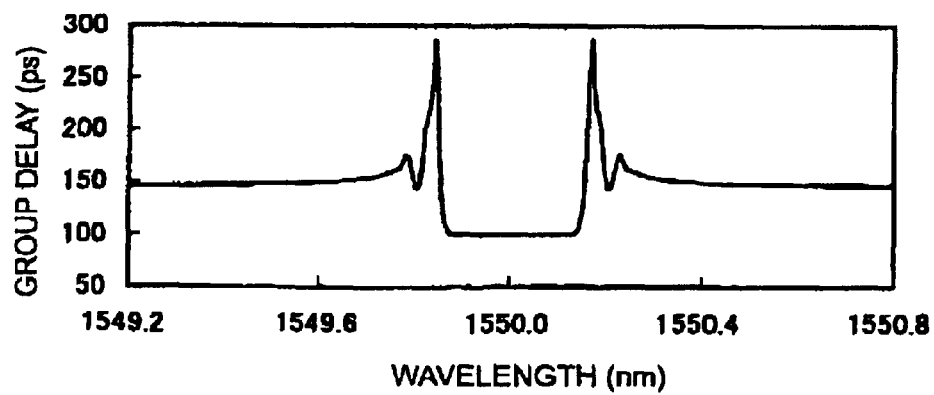
Figure 22A:
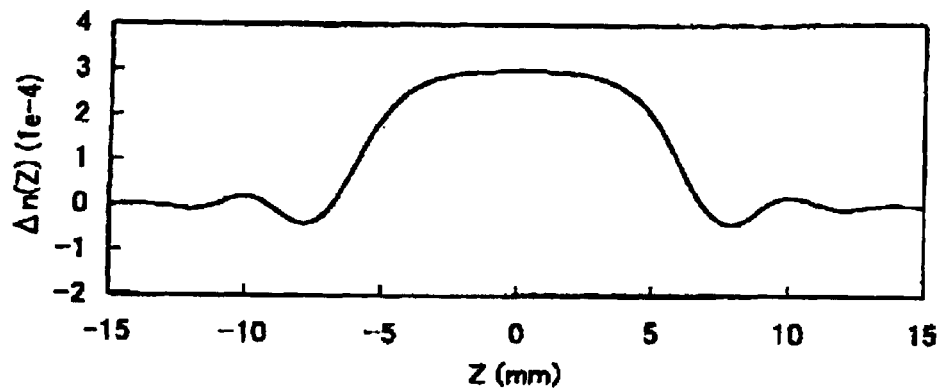
Figure 22B:
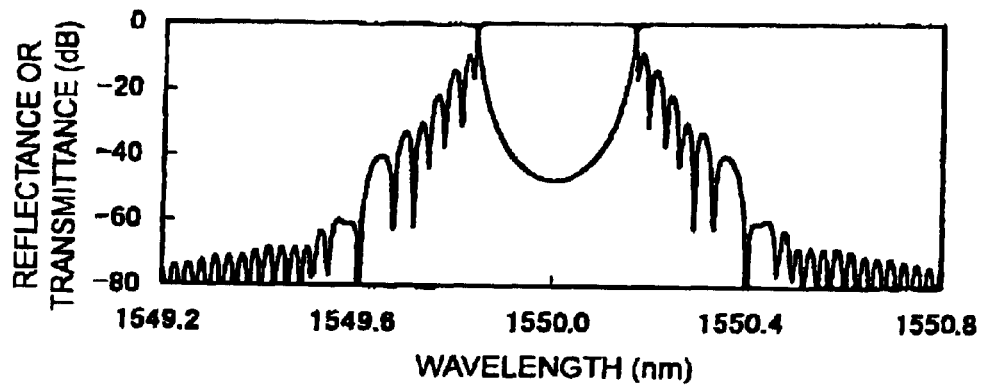
Figure 22C:
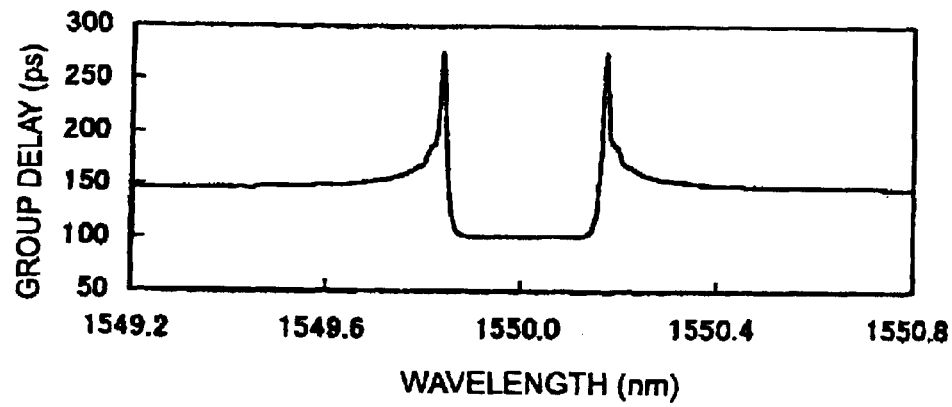
Figure 23A:
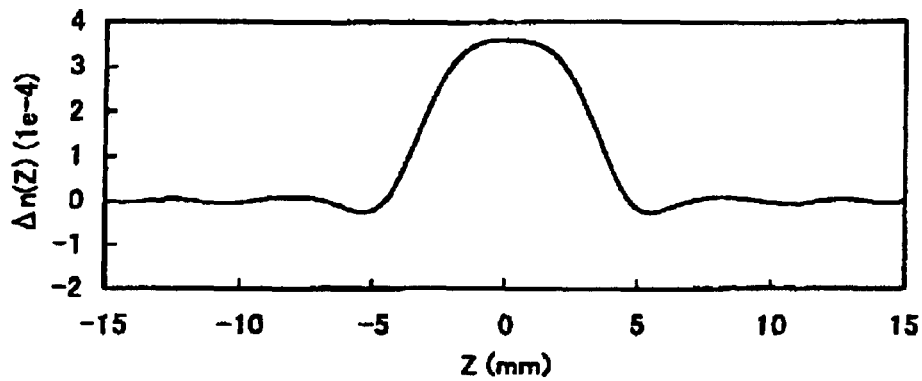
Figure 23B:
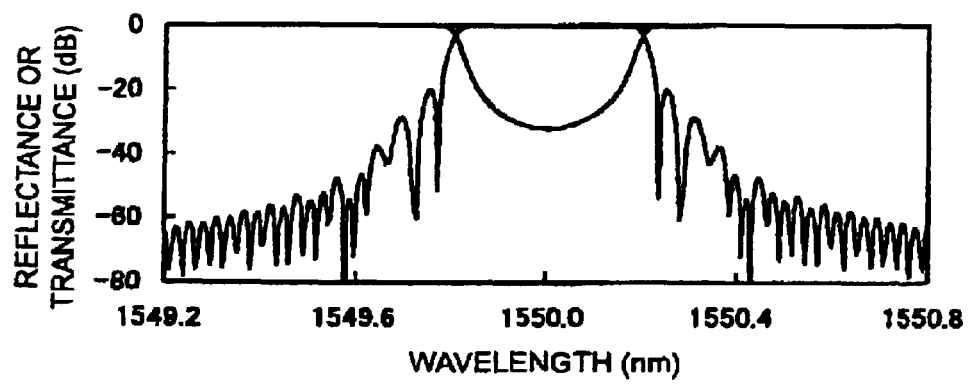
Figure 23C:
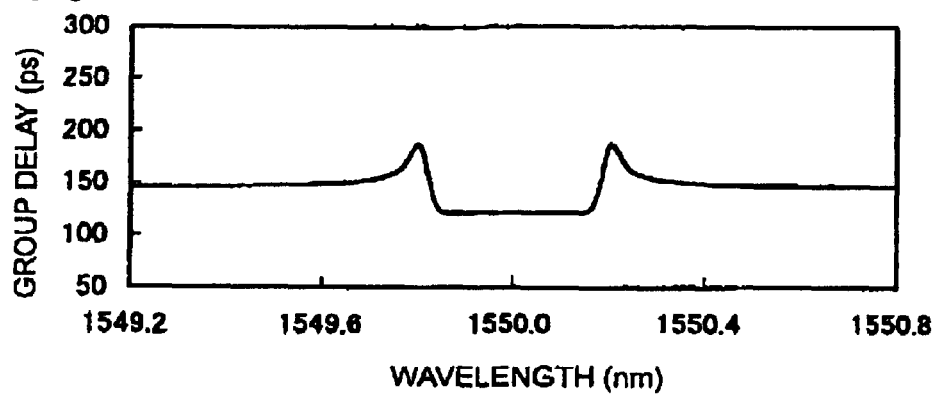
Figure 24A:
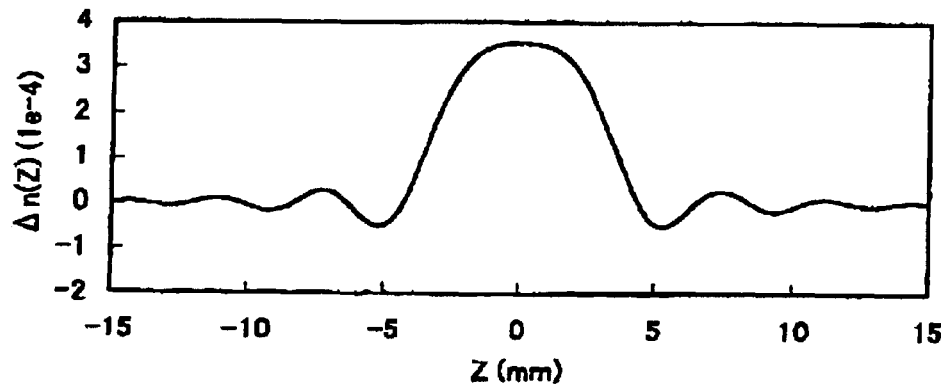
Figure 24B:
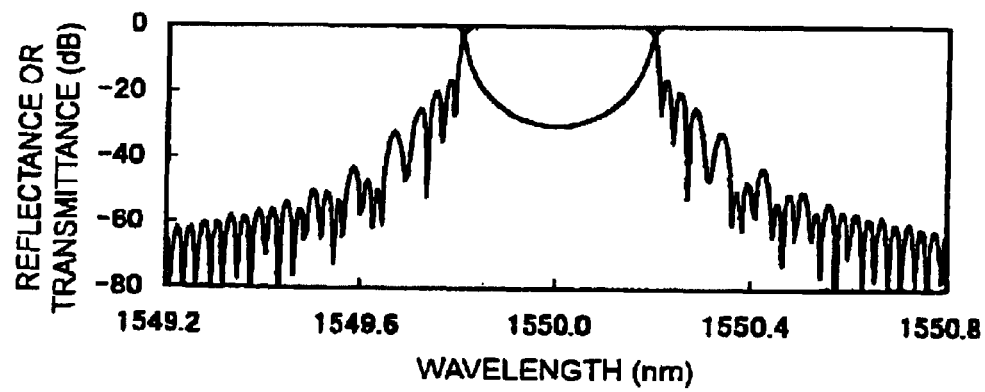
Figure 24C:
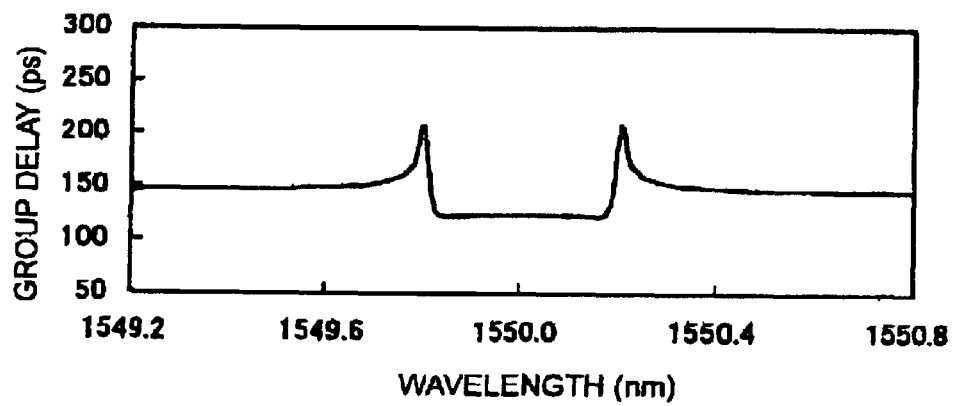
Figure 25A:
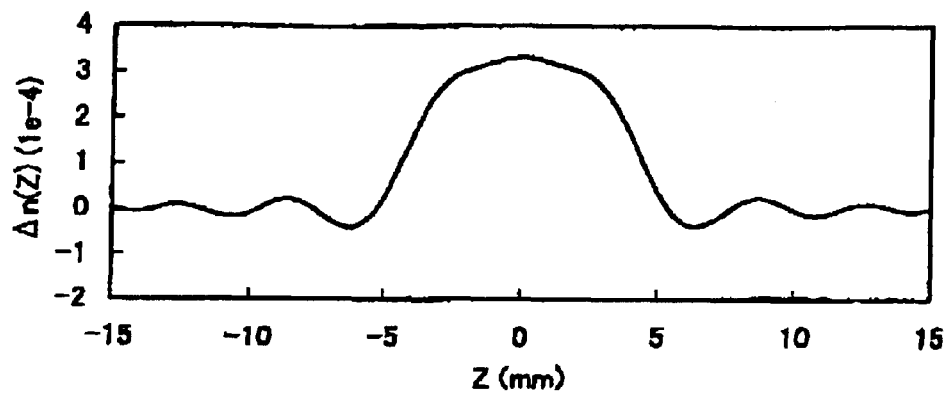
Figure 25B:
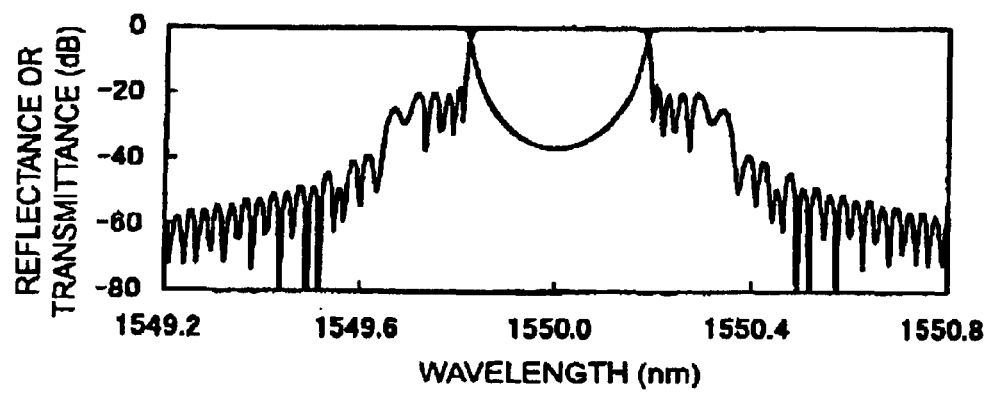
Figure 25C:
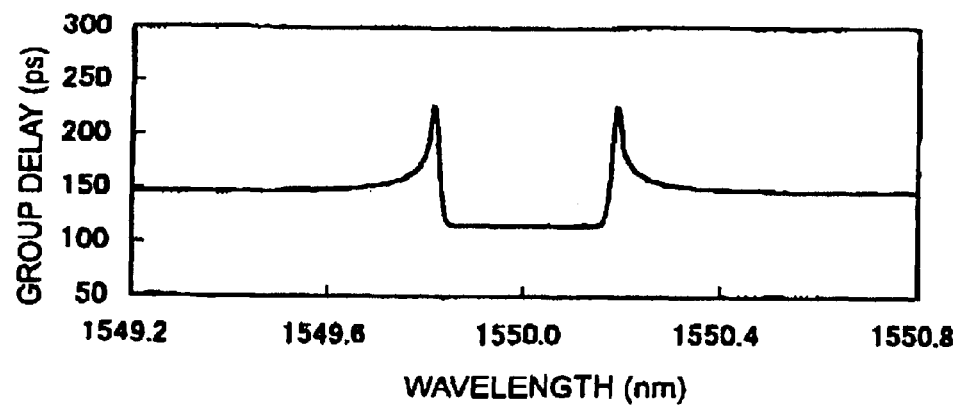
Figure 26A:
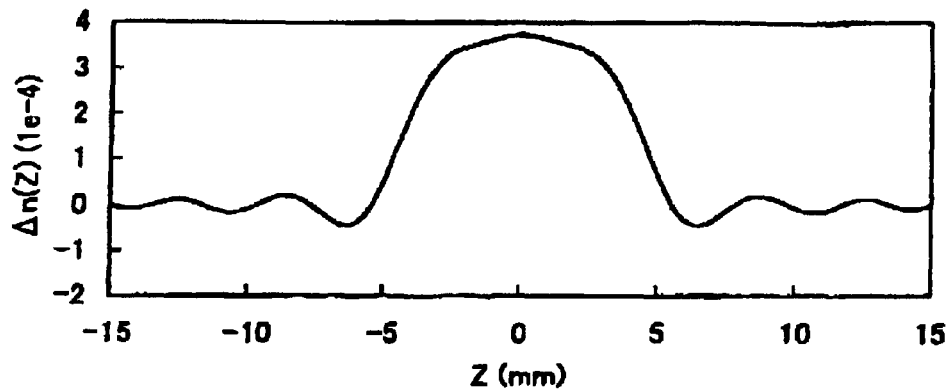
Figure 26B:
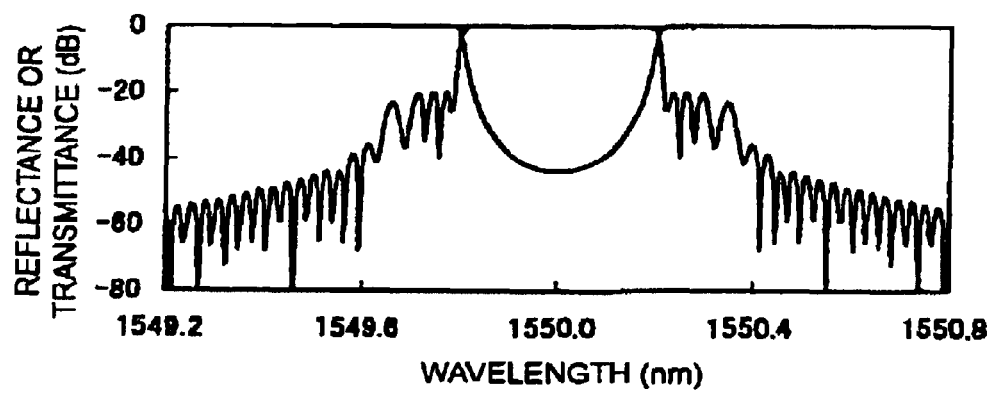
Figure 26C:
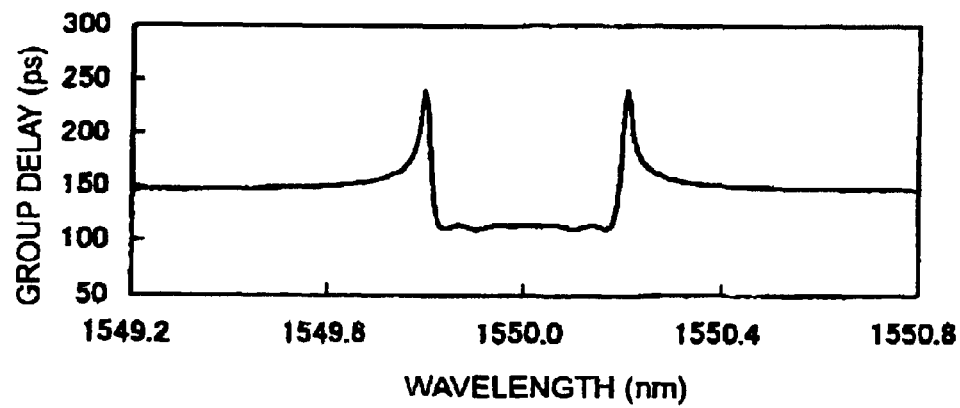
Figure 27A:
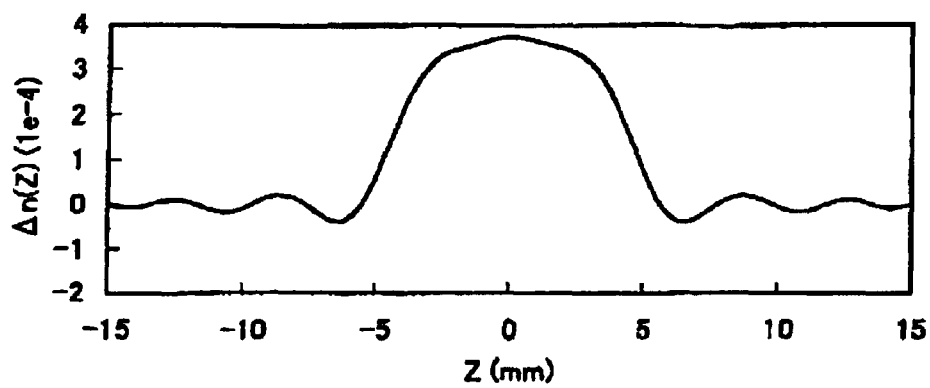
Figure 27B:
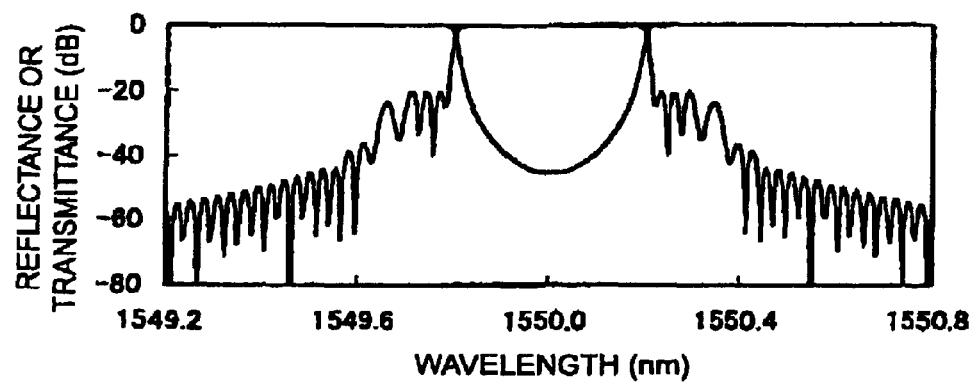
Figure 27C:
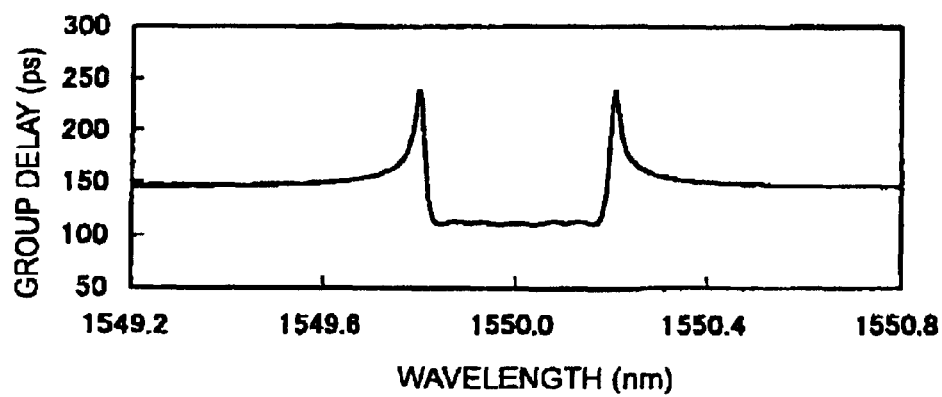
Figure 28A:
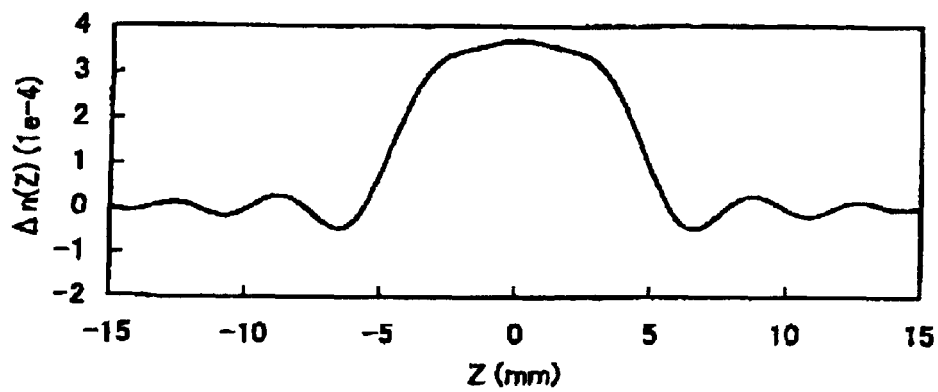
Figure 28B:
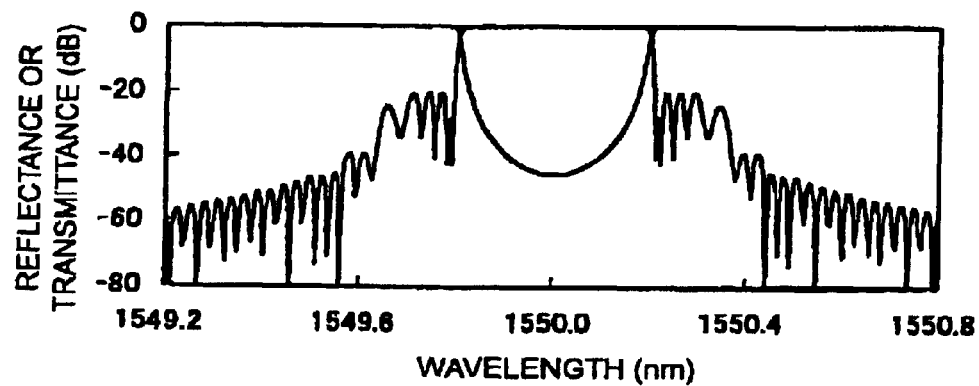
Figure 28C:
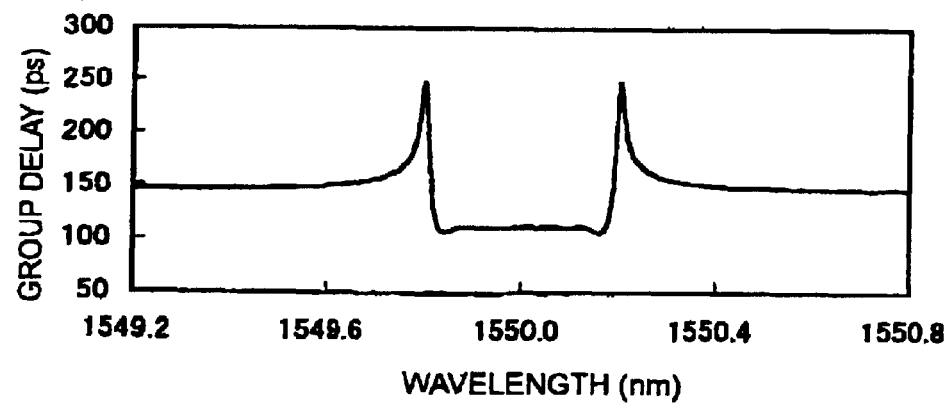
Figure 29A:
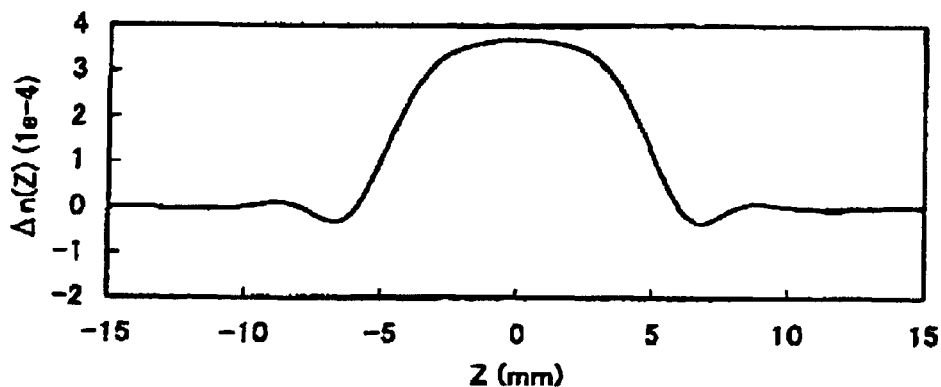
Figure 29B:
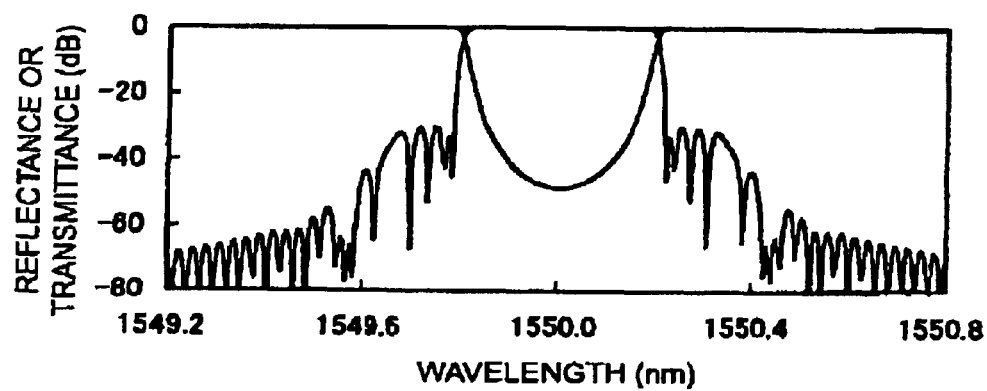
Figure 29C:
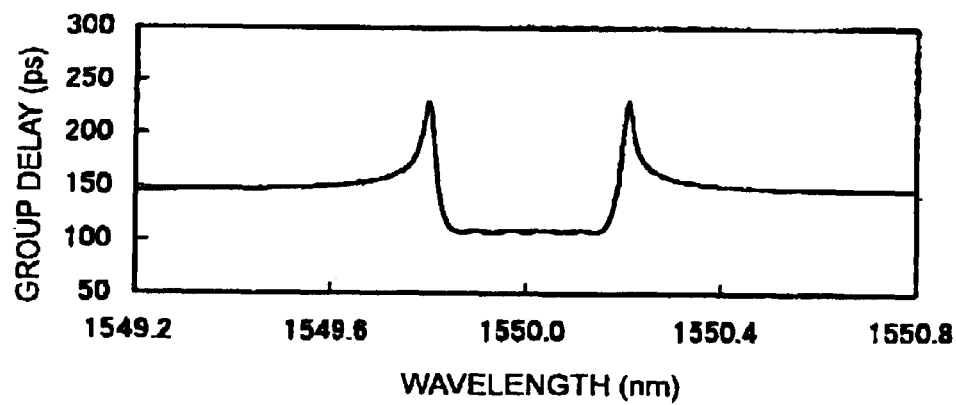
Figure 30A:
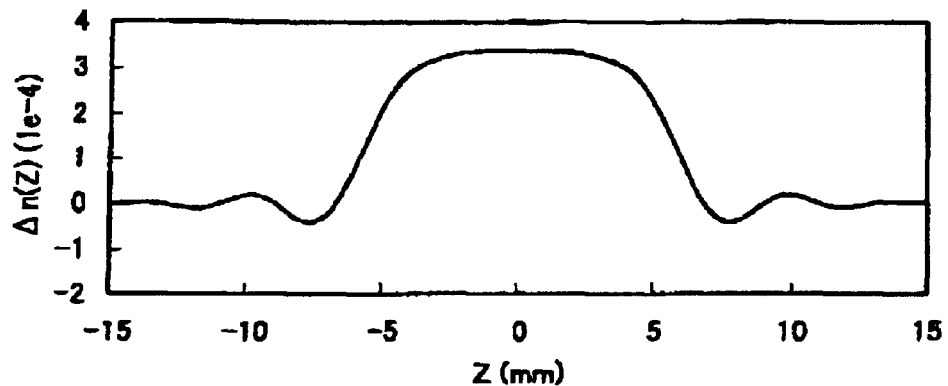
Figure 30B:
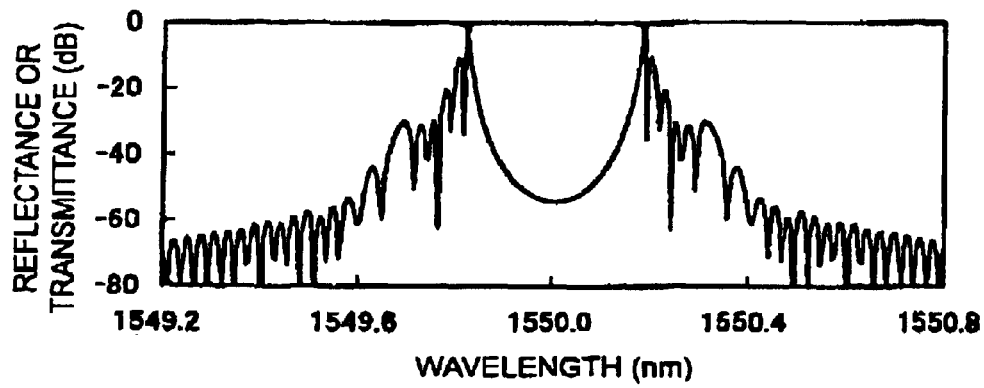
Figure 30C:
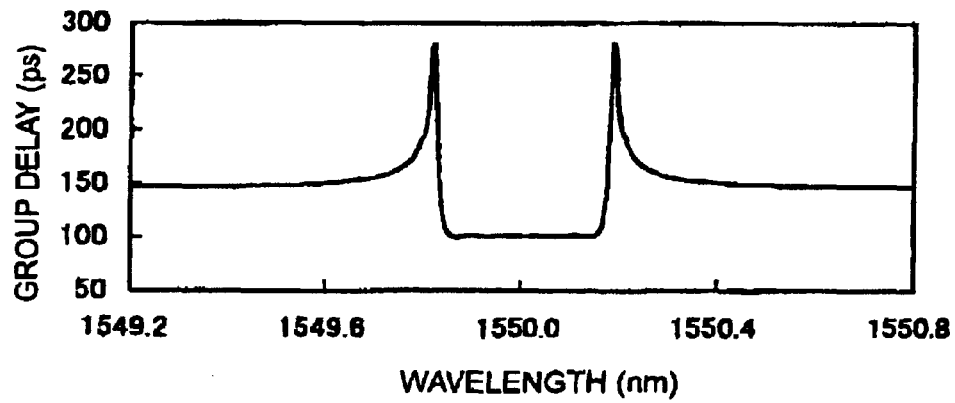
Figure 31A:
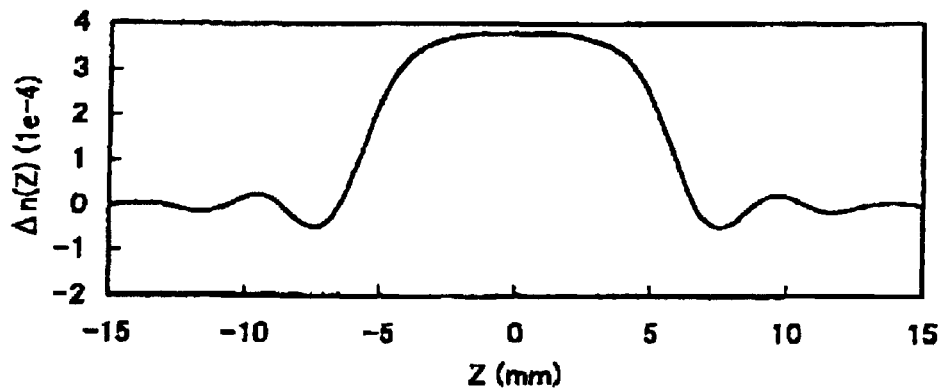
Figure 31B:
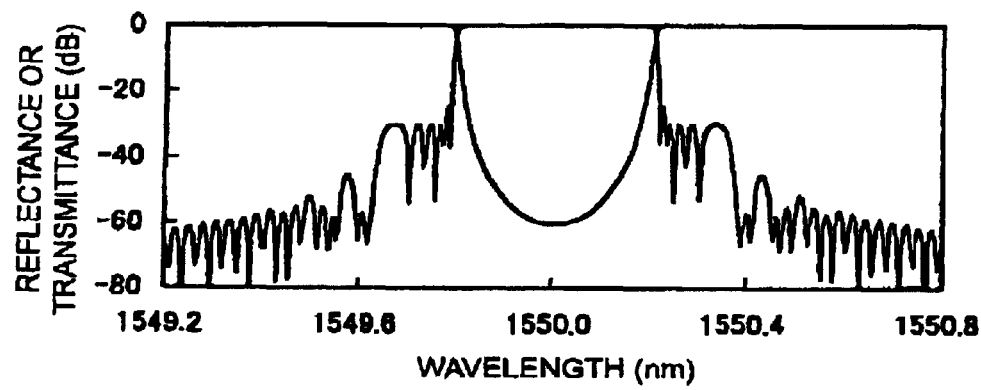
Figure 31C:
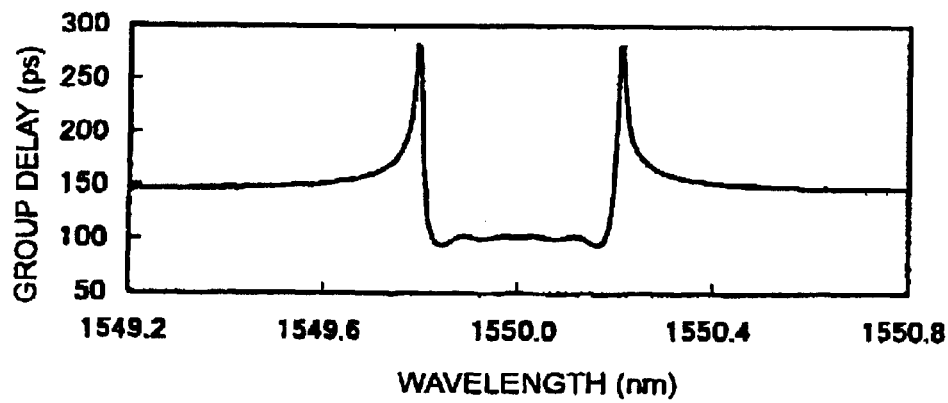
Figure 32A:
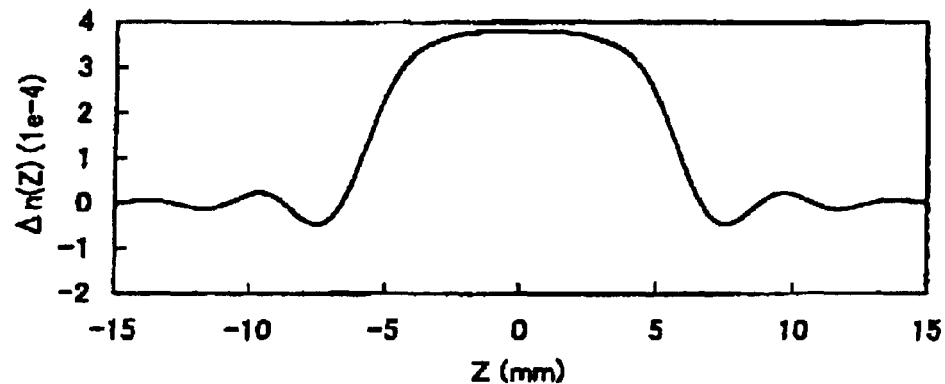
Figure 32B:
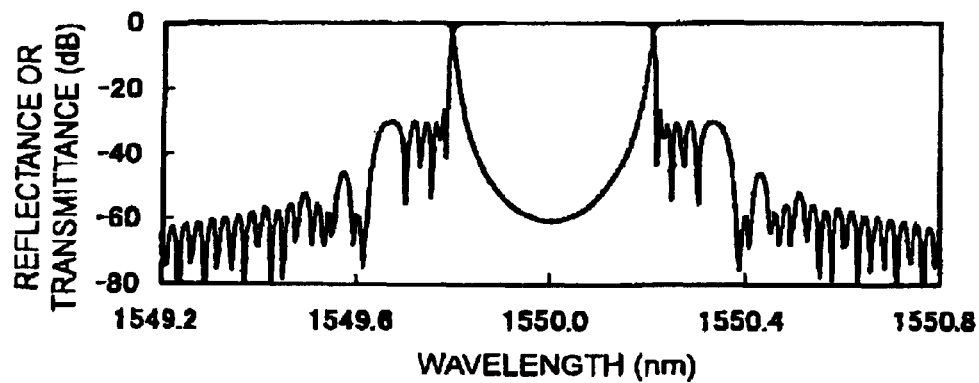
Figure 32C:
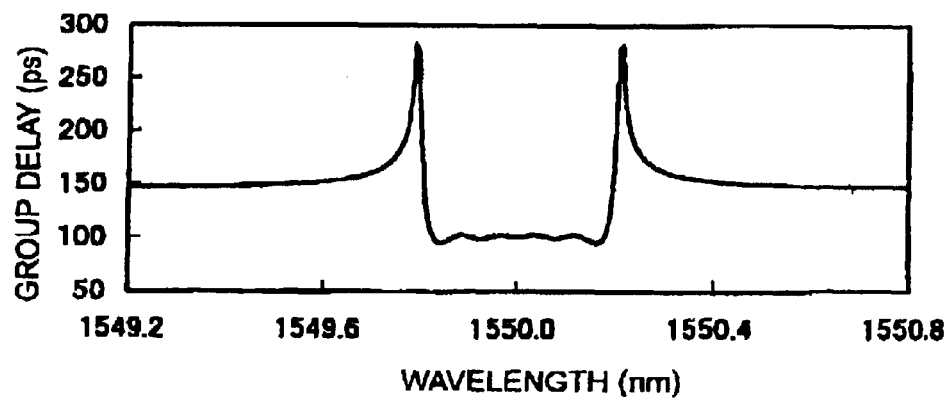
Figure 33A:
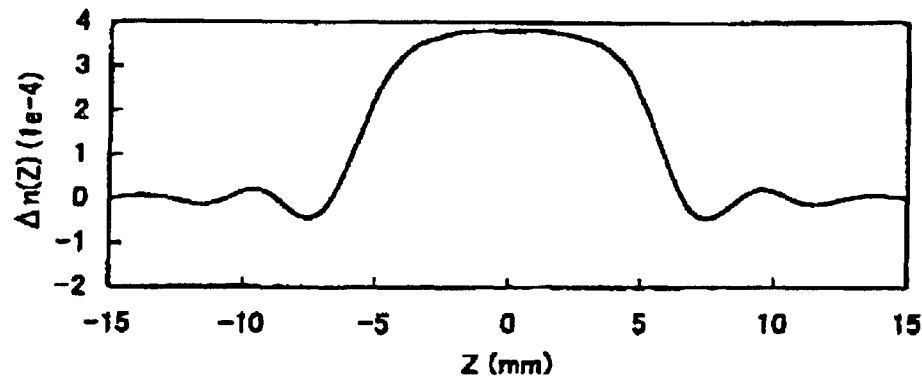
Figure 33B:
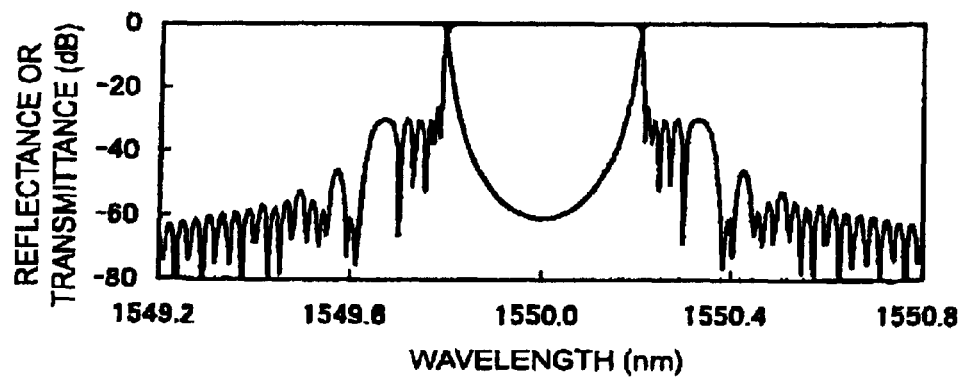
Figure 33C:
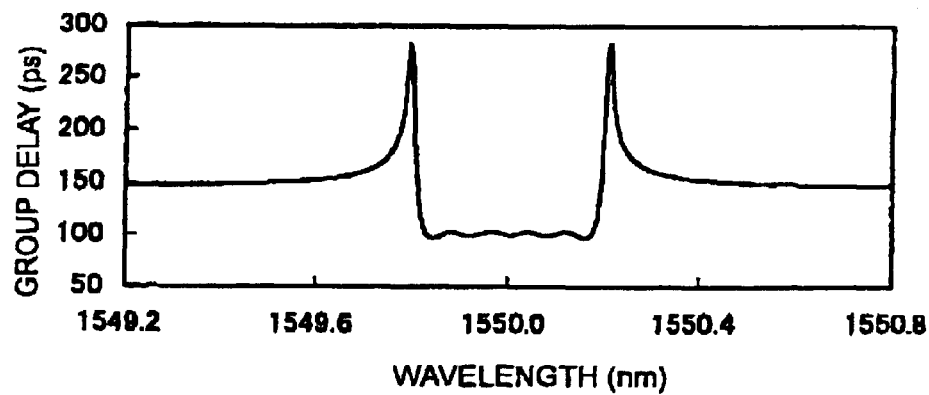

| NO. | B1 nm | B2 nm | B1/B2 | T0 dB | R0 dB | Max group delay defference ps | Correspondent figures |
|---|---|---|---|---|---|---|---|
| 1 | 0.20 | 0.60 | 0.333 | −20.0 | −20.0 | 0.294 | FIGS. 11A–C |
| 2 | 0.20 | 0.60 | 0.333 | −20.0 | −20.0 | 0.358 | FIGS. 12A–C |
| 3 | 0.20 | 0.60 | 0.333 | −20.0 | −20.0 | 0.281 | FIGS. 13A–C |
| 4 | 0.25 | 0.55 | 0.455 | −20.0 | −20.0 | 0.745 | FIGS. 14A–C |
| 5 | 0.25 | 0.55 | 0.455 | −20.0 | −20.0 | 0.621 | FIGS. 15A–C |
| 6 | 0.25 | 0.55 | 0.455 | −20.0 | −20.0 | 0.940 | FIGS. 16A–C |
| 7 | 0.20 | 0.60 | 0.333 | −30.0 | −30.0 | 0.575 | FIGS. 17A–C |
| 8 | 0.20 | 0.60 | 0.333 | −30.0 | −30.0 | 0.864 | FIGS. 18A–C |
| 9 | 0.20 | 0.60 | 0.333 | −30.0 | −30.0 | 0.365 | FIGS. 19A–C |
| 10 | 0.25 | 0.55 | 0.455 | −30.0 | −30.0 | 0.540 | FIGS. 20A–C |
| 11 | 0.25 | 0.55 | 0.455 | −30.0 | −30.0 | 0.653 | FIGS. 21A–C |
| 12 | 0.25 | 0.55 | 0.455 | −30.0 | −30.0 | 0.687 | FIGS. 22A–C |
| 13 | 0.30 | 0.50 | 0.600 | −20.0 | −20.0 | 0.923 | FIGS. 23A–C |
| 14 | 0.30 | 0.50 | 0.600 | −20.0 | −20.0 | 0.980 | FIGS. 24A–C |
| 15 | 0.30 | 0.50 | 0.600 | −20.0 | −20.0 | 1.086 | FIGS. 25A–C |
| 16 | 0.35 | 0.45 | 0.778 | −20.0 | −20.0 | 4.059 | FIGS. 26A–C |
| 17 | 0.35 | 0.45 | 0.778 | −20.0 | −20.0 | 3.332 | FIGS. 27A–C |
| 18 | 0.35 | 0.45 | 0.778 | −20.0 | −20.0 | 5.634 | FIGS. 28A–C |
| 19 | 0.30 | 0.50 | 0.600 | −30.0 | −30.0 | 1.276 | FIGS. 29A–C |
| 20 | 0.30 | 0.50 | 0.600 | −30.0 | −30.0 | 1.679 | FIGS. 5A–C |
| 21 | 0.30 | 0.50 | 0.600 | −30.0 | −30.0 | 1.522 | FIGS. 30A–C |
| 22 | 0.35 | 0.45 | 0.778 | −30.0 | −30.0 | 8.561 | FIGS. 31A–C |
| 23 | 0.35 | 0.45 | 0.778 | −30.0 | −30.0 | 7.561 | FIGS. 32A–C |
| 24 | 0.35 | 0.45 | 0.778 | −30.0 | −30.0 | 6.329 | FIGS. 33A–C | circulator 220, and is outputted from the third port 223 of the optical circulator 220. Namely, the multiplexer/demultiplexer module 10 acts as a multiplexer in this case to multiplex the light of the wavelengths $\lambda_1-\lambda_{m-1}$, $\lambda_{m+1}-\lambda_M$ entering the first port 211 of the optical circulator 210, with the light of the wavelength $\lambda_m$ entering the first port 221 of the optical circulator 220 and output the multiplexed light of the wavelengths $\lambda_1-\lambda_M$ from the third port 223 of the optical circulator 220. If the multiplexer/demultiplexer module 10 is used only as a multiplexer, the module does not have to be equipped with the optical circulator 210.

When the light of the wavelengths $\lambda_1-\lambda_M$ enters the first port 211 of the optical circulator 210 in the multiplexer/demultiplexer module 10, the light of these wavelengths is outputted from the second port 212 of the optical circulator 210 into the diffraction grating device 100. Then the light of the wavelength $\lambda_m$ out of these lightwaves is reflected by the diffraction grating device 100, enters the second port 212 of the optical circulator 210, and is outputted from the third port 213 of the optical circulator 210. On the other hand, the light of the wavelengths $\lambda_1-\lambda_{m-1}$, $\lambda_{m+1}-\lambda_M$ travels through the diffraction grating device 100, enters the second port 222 of the optical circulator 220, and is then outputted from the third port 223 of the optical circulator 220. Namely, the multiplexer/demultiplexer module 10 acts as a demultiplexer in this case to demultiplex the light of the wavelengths $\lambda_1-\lambda_M$ entering the first port 211 of the optical circulator 210, output the light of the wavelength $\lambda_m$ from the third port 213 of the optical circulator 210, and output the light of the wavelengths $\lambda_1-\lambda_{m-1}$, $\lambda_{m+1}-\lambda_M$ from the third port 213 of the optical circulator 220. When the multiplexer/demultiplexer module 10 is used only as a demultiplexer, the module does not have to be equipped with the optical circulator 220.

Furthermore, this multiplexer/demultiplexer module 10 also acts as an optical ADM (Add-Drop Multiplexer), while acting as a multiplexer and as a demultiplexer. Specifically, the multiplexer/demultiplexer module 10 outputs the light of the wavelength Am out of the wavelengths $\lambda_1-\lambda_M$ entering the first port 211 of the optical circulator 210 from the third port 213 of the optical circulator 210 (Drop) and inputs the light of the wavelength $\lambda_M$ carrying other information, from the first port 221 of the optical circulator 220 (Add). Then the module multiplexes the light of the wavelengths $\lambda_1-\lambda_{m-1}$, $\lambda_{m+1}-\lambda_M$ out of the wavelengths $\lambda_1-\lambda_M$ entering the first port 211 of the optical circulator 210, with the light of the wavelength $\lambda_m$ entering the first port 221 of the optical circulator 220, and outputs the multiplexed light of the wavelengths $\lambda_1-\lambda_M$ from the third port 223 of the optical circulator 220.

This multiplexer/demultiplexer module 10 incorporates the compact, antero-posterior symmetric, diffraction grating device 100 as described previously. Accordingly, the multiplexer/demultiplexer module 10 gives rise to only the small group delay difference in the reflection of the light of the wavelength $\lambda_m$ in the first band (reflection band) by the diffraction grating 113 of the diffraction grating device 100, so as to suppress the deterioration in the waveform of the reflected signal light of the wavelength $\lambda_m$, whereby it is feasible to achieve the increase in capacity in the WDM transmission using the multiplexer/demultiplexer module 10 The multiplexer/demultiplexer module 10 is compact, and merely needs to incorporate only one diffraction grating device even in the configuration capable of both multiplexing and demultiplexing (optical ADM), which also ensures the compact configuration in this respect Furthermore, because of the compact configuration, the multiplexer/demultiplexer module 10 permits easy realization of the temperature regulating mechanism or temperature compensating mechanism for restraining the variation in the reflection characteristics due to the temperature variation.

In the case of the diffraction grating device described in Document 2 sited in the section of Background Art, the forming range of the diffraction grating is as long as 120 mm and the diffraction grating is not of antero-posterior symmetry. Therefore, when the multiplexer/demultiplexer module is implemented using it, the module has to be provided with two diffraction grating devices between two optical circulators. Therefore, the multiplexer/demultiplexer, module using the two diffraction grating devices described in Document 2 is large in scale, does not allow easy realization of the temperature regulating mechanism or temperature compensating mechanism, and becomes expensive. In contrast to it, the multiplexer/demultiplexer module 10 according to the present embodiment can be satisfactorily constructed incorporating only one diffraction grating device 100 according to the present embodiment, and thus is compact in scale, permits easy realization of the temperature regulating mechanism or temperature compensating mechanism, and is inexpensive.

Figure 35:
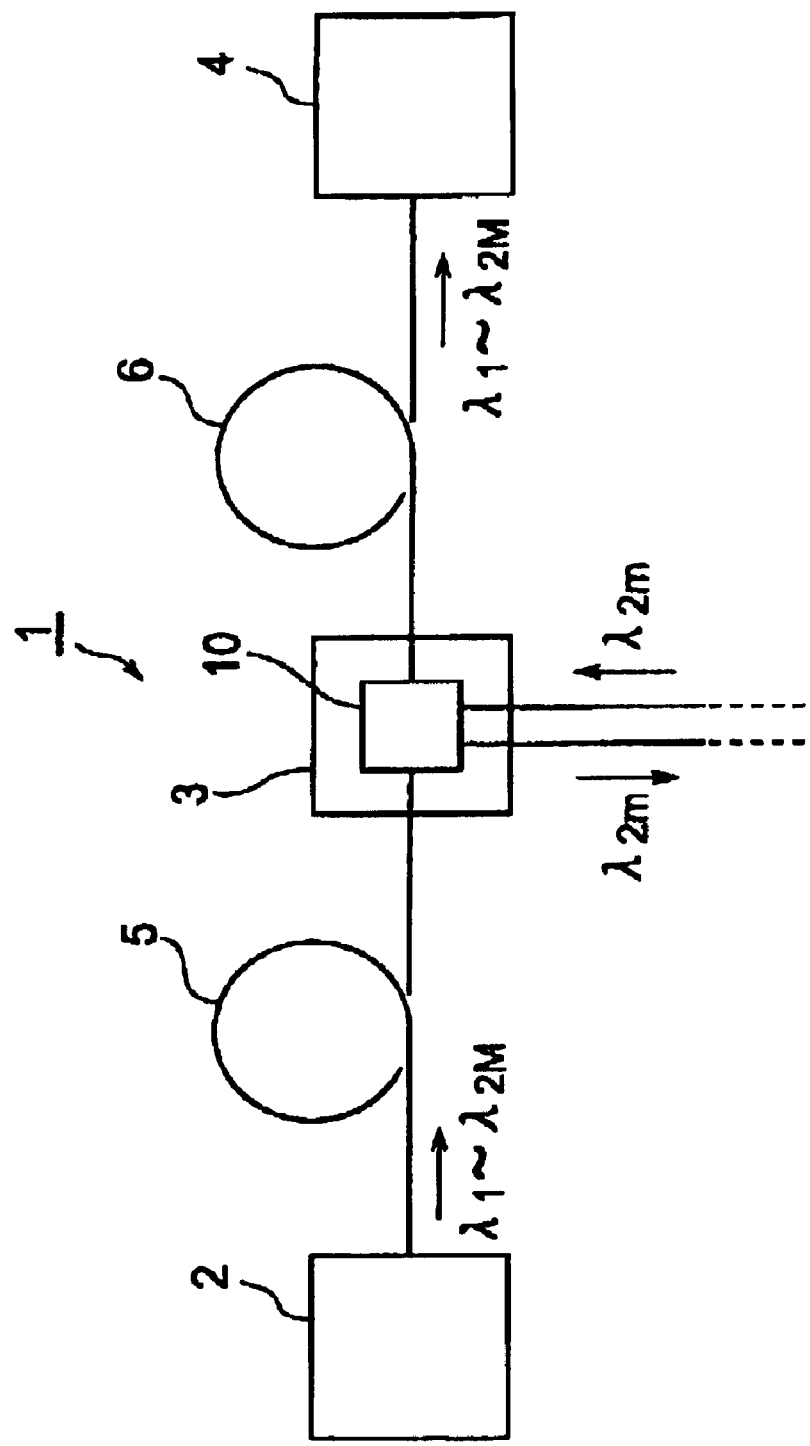
FIG. 35 is a schematic block diagram of an optical transmission system according to the present embodiment.

An embodiment of the optical transmission system according to the present invention will be described below. FIG. 35 is a schematic block diagram of the optical transmission system 1 according to the present embodiment. The optical transmission system 1 is constructed in a configuration wherein an optical fiber transmission line 5 is coupled between a transmitter 2 and a repeater 3, an optical fiber transmission line 6 is also coupled between the repeater 3 and a receiver 4, and the repeater 3 is provided with the multiplexer/demultiplexer module 10.

The transmitter 2 multiplexes signal light of the wavelengths $\lambda_1-\lambda_M$ and sends the multiplexed light into the optical fiber transmission line 5. The repeater 3 receives the signal light of the wavelengths $\lambda_1-\lambda_M$ having propagated through the optical fiber transmission line 5, demultiplexes the signal light by the multiplexer/demultiplexer module 10, sends the signal light of the wavelengths $\lambda_1-\lambda_{m-1}$, $\lambda_{m+1}-\lambda_M$ into the optical fiber transmission line 6, and sends the signal light of the wavelength $\lambda_m$ into another optical fiber transmission line. The repeater 3 also sends signal light of the wavelength $\lambda_m$ fed through another optical fiber transmission line, into the optical fiber transmission line 6. The receiver 4 receives the signal light of the wavelengths $\lambda_1-\lambda_M$ having propagated through the optical fiber transmission line 6 and demultiplexes the light of the wavelengths to complete reception.

The optical transmission system 1 is configured to multiplex or demultiplex the signal light of the wavelengths $\lambda_1-\lambda_M$ using the multiplexer/demultiplexer module 10 incorporating the diffraction grating device 100 according to the present embodiment described above. Accordingly, the group delay difference is small in the reflection of the light of the wavelength $\lambda_m$ in the first band (reflection band) by the diffraction grating device 100 incorporated in the multiplexer/demultiplexer module 10 in the repeater 3, so that the deterioration is well suppressed in the waveform of the reflected signal light of the wavelength $\lambda_m$, thus permitting the large-capacity WDM transmission.

The present invention is by no means intended to be limited to the above embodiments, but the invention permits a variety of modifications. For example, the diffraction grating device of the above embodiment was a device in which the diffraction grating based on the perturbation of refractive index was formed in the optical fiber as an optical waveguide. However, without having to be limited to this, the device may be one in which the diffraction grating based on the perturbation of refractive index is formed in an optical waveguide formed on a flat substrate.

Industrial Applicability

The group delay difference in the reflection of light in the first band is smaller in the diffraction grating device according to the present invention than in the conventional devices, and it is thus feasible to suppress the deterioration in the waveform of the reflected signal light. Since the length of the, predetermined range where the perturbation of refractive index of the diffraction grating is formed can be made short, it is feasible to readily realize the temperature regulating mechanism or temperature compensating mechanism for suppressing the variation in the reflection characteristics due to the temperature variation. Since the amplitude distribution of the perturbation of refractive index of the diffraction grating is of antero-posterior symmetry with respect to the center on the center position of the foregoing predetermined range, one diffraction grating device suffices even in the case of realization of the multiplexer/demultiplexer module capable of both multiplexing and demultiplexing, so that the multiplexer/demultiplexer module can be made compact.

It is obvious that the present invention can be modified in various forms from the above description of the present invention. It is to be understood that such modifications can be made in the invention without departing from the spirit and scope of the present invention, and all improvements obvious to those skilled in the art should be included in the scope of the claims which follow.

What is claimed is:

1. A diffraction grating device in which a diffraction grating based on perturbation of refractive index is formed through a predetermined range in a light guide direction in an optical waveguide and in which said diffraction grating selectively reflects light in a reflection band out of light guided through the optical waveguide, wherein, where a first band is defined as a wavelength band with a maximum bandwidth out of continuous wavelength bands for which the transmittance is not more than $T_0$ (in units of dB) and where a second band is defined as a wavelength band between a maximum wavelength and a minimum wavelength out of wavelengths for which the reflectance is $R_0$ (in units of dB), the perturbation of refractive index of said diffraction grating is of antero-posterior symmetry with respect to the center on a center position of said predetermined range, $T_0$ is not more than −20 dB, $R_0$ is not more than −20 dB, a ratio ($B_1/B_2$) of a width $B_1$ of said first band (in units of nm) to a width $B_2$ of said second band (in units of nm) is not less than 0.3, and a maximum group delay difference (in units of ps) caused by reflection of light in said first band by said diffraction grating is not more than $0.011 \times \exp(7.86 \times B_1/B_2 - 0.045 \times R_0)/B_1$.

2. A diffraction grating device according to claim 1, wherein an amplitude distribution of the perturbation of refractive index of said diffraction grating has a phase inversion portion.

3. A diffraction grating device according to claim 1, wherein a length of said predetermined range in which the perturbation of refractive index of said diffraction grating is formed, is not more than 40 mm.

4. A diffraction grating device according to claim 1, wherein said maximum group delay difference is not more than 10 ps.

5. A diffraction grating device according to claim 1, wherein said maximum group delay difference is not more than 2.5 ps.

6. A diffraction grating device according to claim 1, wherein the width $B_2$ of said second band is not more than 1.6 nm.

7. A diffraction grating device according to claim 1, wherein the width $B_2$ of said second band is not more than 0.8 nm.

8. A method of making a diffraction grating device according to claim 1, wherein an amplitude distribution of the perturbation of refractive index of said diffraction grating is designed by nonlinear programming and the diffraction grating device is produced based thereon.

9. A multiplexer/demultiplexer module comprising a diffraction grating device according to claim 1, which is configured to selectively reflect light in the reflection band by the diffraction grating device to multiplex or demultiplex light.

10. An optical transmission system for performing optical transmission using wavelength-multiplexed signal light of multiple wavelengths, which comprises the multiplexer/demultiplexer module according to claim 9, and which is configured to multiplex or demultiplex said signal light of multiple wavelengths by the multiplexer/demultiplexer module.

* * * * *